US008045591B2

(12) United States Patent
Kim et al.

(10) Patent No.: US 8,045,591 B2

(45) Date of Patent: Oct. 25, 2011

(54) BROADCASTING SIGNAL RECEIVER AND METHOD FOR TRANSMITTING/RECEIVING BROADCASTING SIGNAL

(75) Inventors: Jin Woo Kim, Seoul (KR); In Hwan Choi, Gyeonggi-do (KR); Kook Yeon Kwak, Gyeonggi-do (KR); Hyoung Gon Lee, Seoul (KR); Won Gyu Song, Seoul (KR); Jin Pil Kim, Seoul (KR); Jong Moon Kim, Gyeonggi-do (KR); Byoung Gill Kim, Seoul (KR); Chang Sik Yun, Daejeon (KR)

(73) Assignee: LG Electronics Inc., Seoul (KR)

( * ) Notice: Subject to any disclaimer, the term of this patent is extended or adjusted under 35 U.S.C. 154(b) by 852 days.

(21) Appl. No.: 12/027,468

(22) Filed: Feb. 7, 2008

(65) Prior Publication Data

US 2009/0262679 A1 Oct. 22, 2009

Related U.S. Application Data

(60) Provisional application No. 60/911,807, filed on Apr. 13, 2007, provisional application No. 60/978,733, filed on Oct. 9, 2007, provisional application No. 60/947,984, filed on Jul. 4, 2007.

(30) Foreign Application Priority Data

Feb. 9, 2007 (KR) ........................ 10-2007-0013927

(51) Int. Cl.
*H04N 7/12* (2006.01)
*G06F 11/00* (2006.01)

(52) U.S. Cl. ..... 370/535; 370/537; 375/265; 348/385.1; 714/746

(58) Field of Classification Search ........................ None
See application file for complete search history.

(56) References Cited

U.S. PATENT DOCUMENTS

| | | | | |
|---|---|---|---|---|
| 5,634,138 | A | 5/1997 | Ananthan | |
| 5,649,284 | A | 7/1997 | Yoshinobu | |
| 5,797,093 | A | 8/1998 | Houde | |
| 6,067,457 | A | 5/2000 | Erickson | |
| 6,243,469 | B1 | 6/2001 | Kataoka et al. | |
| 6,263,466 | B1 * | 7/2001 | Hinedi et al. | 714/755 |
| 6,308,066 | B1 | 10/2001 | Ranta et al. | |
| 6,309,066 | B1 | 10/2001 | Kan | |
| 6,370,391 | B1 | 4/2002 | Lietsalmi | |
| 6,977,914 | B2 | 12/2005 | Paila et al. | |
| 2003/0099303 | A1 * | 5/2003 | Birru et al. | 375/265 |
| 2004/0090997 | A1 * | 5/2004 | Choi et al. | 370/535 |
| 2005/0054345 | A1 | 3/2005 | Lee | |
| 2005/0168641 | A1 | 8/2005 | Seo | |
| 2006/0029159 | A1 | 2/2006 | Oh | |

(Continued)

FOREIGN PATENT DOCUMENTS

KR 10-2000-0040481 7/2000

(Continued)

*Primary Examiner* — Robert Scheibel

(74) *Attorney, Agent, or Firm* — Lee, Hong, Degerman, Kang & Waimey

(57) ABSTRACT

A broadcasting signal receiver and a method for transmitting/receiving a broadcasting signal are disclosed. An identifier of a cell is set in the broadcasting signal and, if the cell is changed, channel information of the changed cell can be obtained from program table information having the channel information of the cell. Accordingly, the broadcasting signal receiver can continuously output a program although the cell is changed.

6 Claims, 17 Drawing Sheets

U.S. PATENT DOCUMENTS

| | | | | |
|---|---|---|---|---|
| 2006/0184965 | A1 | 8/2006 | Lee et al. | |
| 2007/0076584 | A1 * | 4/2007 | Kim et al. | 370/206 |
| 2008/0192777 | A1 * | 8/2008 | Choi et al. | 370/539 |
| 2010/0180294 | A1 * | 7/2010 | Yun et al. | 725/33 |

FOREIGN PATENT DOCUMENTS

| | | |
|---|---|---|
| KR | 10-2006-0055959 | 5/2006 |
| KR | 10-2006-0068449 | 6/2006 |
| KR | 10-2007-0013168 | 1/2007 |
| WO | WO01/05157 | 1/2001 |

* cited by examiner

FIG. 12

```
NIT PID= 0x010
Table_id=0x40

  ..................................................
network_descriptor()
{

  cell frequency link descriptor
    {
      tag=0x6D
      cell_id=0x0001
      frequency=0x03aefe40 (Fc=618MHz)
      cell_id=0x0002
      frequency=0x4a32240 (Fc=778MHz)
    }
}
  ............................................................

-TS loop #1
{
    transport_stream_id=0x0901
  original_network_id=0x2114
      service_list_descriptor()
      {
                 .......................................
      }

      terrestrial_delivery_system_descriptor()
      {
          tag=0x5a
          centre_frequency=0x03aefe40 (Fc=618MHz)
          bandwidth=010(6MHz)
          time_Slicing_indicator=0(least one used)
          modulation=01(MVSB)
          sccc_rate-HP_stream=01(1/4)
          sccc_code_rate-LP_stream=01(1/4)
          rs_code_rate-HP_stream =001
          rs_code_rate-LP_stream =001
          other_frequency_flag=1(other frequency is use)
      }
}
-TS loop #2
{
  transport_stream_id=0x0901
  original_network_id=0x2114
      service_list_descriptor()
      {
                 .......................................
      }

      terrestrial_delivery_system_descriptor()
      {
          tag=0x5a
          centre_frequency=0x4a32240 (Fc=778MHz)
          bandwidth=010(6MHz)
          time_Slicing_indicator=0 (least one used)
          modulation=01(MVSB)
          sccc_rate-HP_stream=00 (1/2)
          sccc_code_rate-LP_stream=00(1/2)
          rs_code_rate-HP_stream =001
          rs_code_rate-LP_stream =001
          other_frequency_flag=0(no other frequency is use)
      }
}
```

BROADCASTING SIGNAL RECEIVER AND METHOD FOR TRANSMITTING/RECEIVING BROADCASTING SIGNAL

This application claims the benefit of Korean Patent Application No. 10-2007-0013927, filed on Feb. 9, 2007, which is hereby incorporated by reference as if fully set forth herein.

This application claims the benefit of U.S. Provisional Application No. 60/911,807, filed on Apr. 13, 2007, in the name of inventors Jin Woo KIM, In Hwan CHOI, Kook Yeon KWAK, Uyoung Gon LEE and Won Gyu SONG, titled "APPARATUS FOR RECEIVING A BROADCAST SIGNAL AND METHOD FOR TRANSMITTING/RECEIVING A BROADCAST SIGNAL", which is hereby incorporated by reference.

This application claims the benefit of U.S. Provisional Application No. 60/978,733, filed on Oct. 9, 2007, in the name of inventors Chang Sik YUN, Won Gyu SONG, In Hwan CHOI, Kook Yeon KWAK, Byoung Gill KIM, Jin Woo KIM, Hyoung Gon LEE, Jong Moon KIM, and Jin Pil KIM, titled "DIGITAL BROADCAST SYSTEM AND METHOD OF PROCESSING BROADCAST SIGNAL", which is hereby incorporated by reference.

This application claims the benefit of U.S. Provisional Application No. 60/947,984, filed on Jul. 4, 2007, in the name of inventors In Hwan CHOI, Won Gyu SONG, Kook Yeon KWAK, Byoung Gill KIM, Jin Woo KIM, Hyoung Gon LEE and Jong Moon KIM, titked "DIGITAL BROADCASTING SYSTEM AND METHOD OF PROCESSING DATA IN DIGITAL BROADCASTING SYSTEM".

BACKGROUND OF THE INVENTION

1. Field of the Invention

The present invention relates to a broadcasting signal receiver and a method for transmitting/receiving a broadcasting signal.

2. Discussion of the Related Art

A digital broadcasting system for mobile reception, which is capable of transmitting/receiving a broadcasting signal, has been developed and commercialized. However, the digital broadcasting system for mobile reception is designed independent of a broadcasting system for fixed reception and thus is incompatible with the conventional broadcasting system for fixed reception.

For example, a transmission system according to an advanced television systems committee (ATSC) vestigial sideband (VSB) scheme was designed without considering mobility, due to terrestrial characteristics. The ATSC broadcasting system is suitable for a multi-frequency network environment. In the ATSC broadcasting system, if a user moves to an area where broadcasting contents are broadcast with a different frequency, the user should tune a channel again in order to continuously view the broadcasting contents.

SUMMARY OF THE INVENTION

Accordingly, the present invention is directed to a broadcasting signal receiver and a method for transmitting/receiving a broadcasting signal that substantially obviate one or more problems due to limitations and disadvantages of the related art.

An object of the present invention is to provide a broadcasting signal receiver and a method for transmitting/receiving a broadcasting signal, of which mobile reception is possible in a multi-frequency network environment.

Another object of the present invention is to provide a broadcasting signal receiver and a method for transmitting/receiving a broadcasting signal in a broadcasting system for mobile reception compatible with a broadcasting system for fixed reception.

Another object of the present invention is to provide a broadcasting signal receiver and a method for transmitting/receiving a broadcasting signal, which are capable of allowing a user to conveniently view a broadcasting program even when the user moves to an area where a broadcasting program is broadcast with a different frequency, in a multi-frequency network environment.

Additional advantages, objects, and features of the invention will be set forth in part in the description which follows and in part will become apparent to those having ordinary skill in the art upon examination of the following or may be learned from practice of the invention, The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for transmitting a broadcasting signal, the method including: outputting the broadcasting signal in which program table information including physical channel information of at least one cell and broadcasting data are multiplexed in the program table information of the broadcasting signal; modulating the multiplexed broadcasting signal; and transmitting the modulated broadcasting signal.

The modulating may include setting an identifier of a cell, which will transmit the broadcasting signal, in signaling information included in a transmission parameter of the multiplexed broadcasting signal.

The program table information may include at least one of a central frequency of the broadcasting signal transmitted from the cell, a bandwidth, information indicating whether the broadcasting signal is a burst signal, a modulation method of the broadcasting signal, and an error correction encoding method of the broadcasting signal.

In another aspect of the present invention, there is provided a method for receiving a broadcasting signal, the method including: receiving the broadcasting signal including program table information including physical channel information of at least one cell from a first cell; tuning a channel of the broadcasting cell transmitted from a second cell using the physical channel information of the program table information if the power of the received broadcasting signal is less than a first threshold value; and receiving and outputting the broadcasting signal from the second cell if the power of the broadcasting signal received from the second cell is greater than a second threshold value, and receiving the broadcasting signal from any one of the first cell or a third cell if the power of the broadcasting signal received from the second cell is less than the second threshold value.

The tuning may include obtaining an identifier of the second cell from signaling information included in a transmission parameter of the broadcasting signal of the second cell.

The tuning may be performed in a reception off period of the broadcasting signal received from the first cell.

The broadcasting signal received from the first cell and the broadcasting signal received from the second cell may include the same broadcasting program.

In another aspect of the present invention, there is provided a broadcasting signal receiver including: a tuner which receives program table information including physical channel information of at least one cell and a broadcasting signal including an identifier of the cell; a demodulator which demodulates the broadcasting signal received by the tuner and outputs the demodulated broadcasting signal; a demultiplexer which demultiplexes the broadcasting signal output from the demodulator; a program table information decoder which obtains the physical channel information of the cell from the program table information output from the demultiplexer; a decoder which decodes the broadcasting signal output from the demultiplexer and outputs a broadcasting program; an output unit which outputs the broadcasting program output from the decoder; and a controller which determines whether the cell is changed from the power of the received broadcasting signal and outputs the same broadcasting program as the broadcasting program of the cell before the change using the physical channel information of the changed cell obtained by the program table information decoder if the cell is changed.

The demodulator may obtain an identifier of the changed cell from signaling information of the received broadcasting signal, and the controller may identify the changed cell from the identifier of the cell.

The identifier of the cell in the broadcasting signal received by the tuner may be included in signaling information included in a transmission parameter of the broadcasting signal.

The broadcasting signal receiver may further include an IP filter which filters an IP stream included in the broadcasting signal.

The program table information may include the physical channel information of the identifier of the cell.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention In the drawings:

FIG. 12 is a view showing program table information including physical channel information of each cell;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, exemplary embodiments of the present invention will be described with reference to the accompanying drawings.

Figure 1:
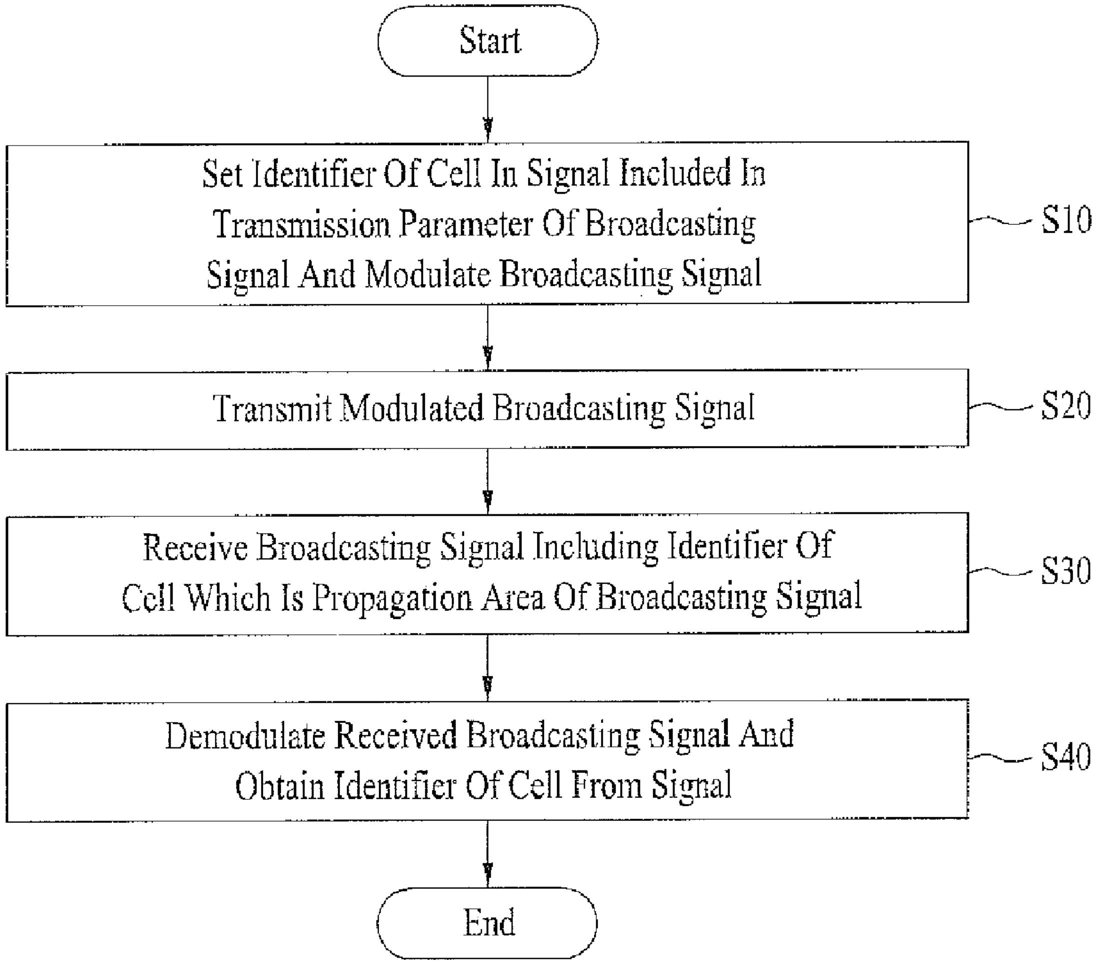
FIG. 1 is a flowchart illustrating a method for transmitting/receiving a broadcasting signal according to an embodiment.

FIG. 1 is a flowchart illustrating a method for transmitting/receiving a broadcasting signal according to an embodiment. Hereinafter, the method for transmitting/receiving the broadcasting signal according to the present embodiment will be described with reference to FIG. 1.

A broadcasting transmitter side sets an identifier of a cell, which is a propagation area of a broadcasting signal, in signaling information included in a transmission parameter of the broadcasting signal and modulates the broadcasting signal (S10).

The modulated broadcasting signal is transmitted (S20).

A broadcasting receiver side receives the broadcasting signal including the identifier of the cell which is a propagation area of the broadcasting signal (S30).

The received broadcasting signal is demodulated so as to obtain the identifier of the cell from the signaling information included in the transmission parameter of the broadcasting signal (S40).

In the present embodiment, particularly, if the broadcasting receiver receives the broadcasting signal while moving in the multi-frequency network (MFN) environment, the propagation area of the broadcasting signal transmitted with any one of multiple frequencies can be identified.

Figure 2:
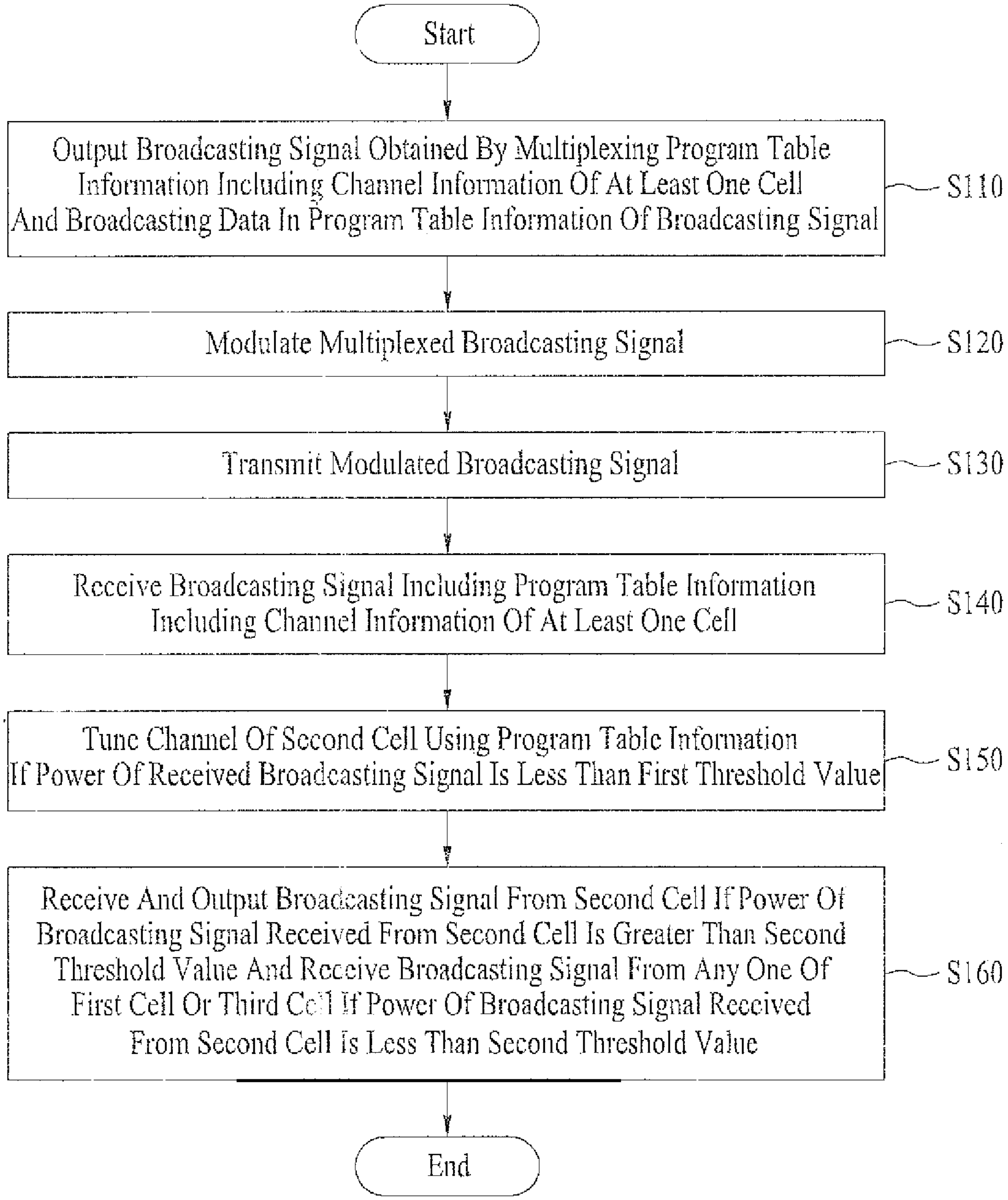
FIG. 2 is a flowchart illustrating a method for transmitting/receiving a broadcasting signal according to another embodiment.

FIG. 2 is a flowchart illustrating a method for transmitting/receiving a broadcasting signal according to another embodiment. Hereinafter, the method for transmitting/receiving the broadcasting signal according to the present embodiment will be described with reference to FIG. 2.

A broadcasting transmitter side outputs a broadcasting signal obtained by multiplexing broadcasting data and program table information including channel information of at least one cell (S110). The program table information will be described in the following embodiment.

The program table information may include information on a cell which is a propagation area of the broadcasting signal, for example, channel information of cells adjacent to a current cell. Program channel information of S210 may be physical channel information and may include physical channel information transmitted by transmitters of a plurality of broadcasting stations of cells.

Then, the multiplexed broadcasting signal is modulated (S120) and the modulated broadcasting signal is transmitted (S130).

A broadcasting receiver side receives the broadcasting signal including the program table information containing the channel information of at least one cell (S140).

If the power of the received broadcasting signal is less than a first threshold value, the channel of a second cell is tuned using the program table information (S150).

If the power of the broadcasting signal received from the second cell is greater than a second threshold value, the broadcasting received from the second cell is output and, if the power of the broadcasting signal received from the second cell is less than the second threshold value, the broadcasting signal is received from any one of the first cell or the third cell (S160).

According to the present embodiment, even when the broadcasting receiver escapes from the cell which is the propagation cell of the broadcasting signal, it is possible to continuously view the broadcasting program.

Figure 3:
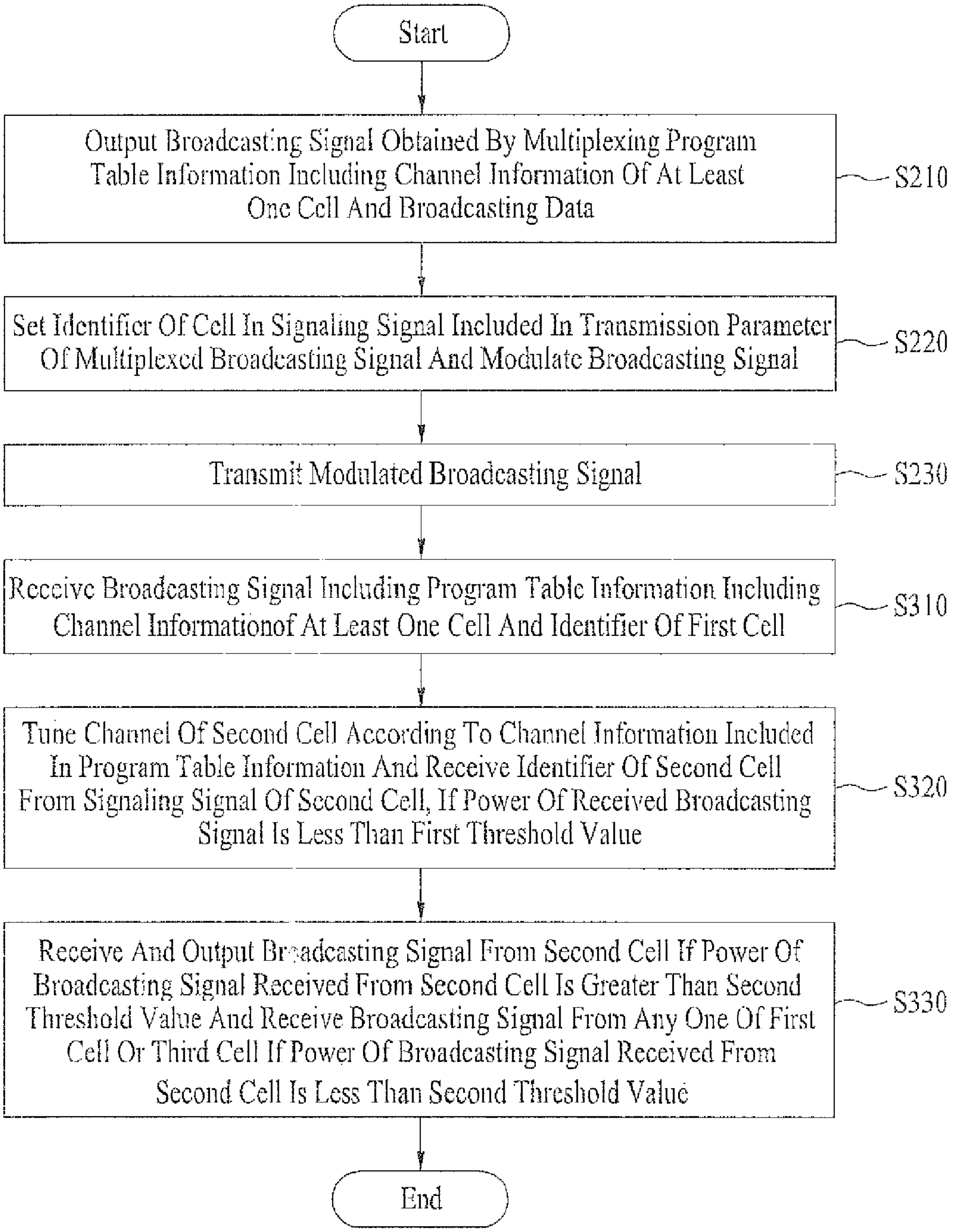
FIG. 3 is a flowchart illustrating a method for transmitting/receiving a broadcasting signal according to another embodiment.

FIG. 3 is a flowchart illustrating a method for transmitting/receiving a broadcasting signal according to another embodiment. Hereinafter, the method for transmitting/receiving the broadcasting signal according to the present embodiment will be described with reference to FIG. 3.

A broadcasting transmitter side outputs a broadcasting stream obtained by multiplexing broadcasting data and program table information including channel information of at least one cell (S210).

An identifier of the cell is set in signaling information included in a transmission parameter of the multiplexed broadcasting signal and the broadcasting signal is modulated (S220).

The broadcasting signal including the identifier of the cell and the program table information is transmitted (S230).

A broadcasting receiver side receives the broadcasting signal including the program channel information containing the channel information of at least one cell and an identifier of a first cell (S310).

If the power of the received broadcasting signal is less than a first threshold value, the channel of a second cell is tuned according to the channel information included in the program table information and an identifier of the second cell is received from the signaling information included in the transmission parameter of the broadcasting signal of the second cell (S320).

If the power of the broadcasting signal received from the second cell is greater than a second threshold value, the broadcasting signal received from the second cell is output and, if the power of the broadcasting signal received from the second cell is less than the second threshold value, the broadcasting signal is received from any one of the first cell or the third cell (S330).

In order to easily describe the present invention, for example, an ASTC broadcasting system suitable for the MFN environment will be described, but the present invention is not limited thereto.

Figure 4:
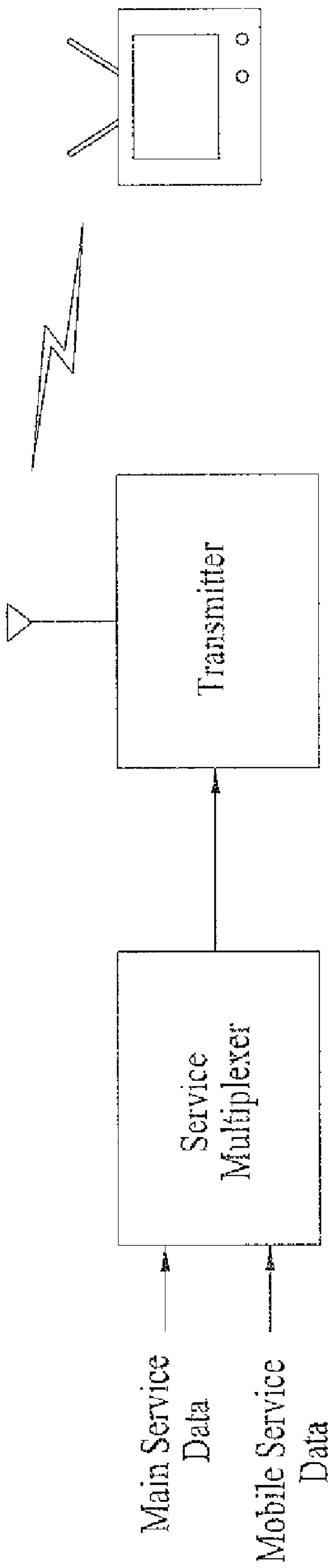
FIG. 4 is a schematic block diagram showing an ATSC broadcasting system in order to easily describe the present invention.

FIG. 4 is a schematic block diagram showing the ATSC broadcasting system in order to easily describe the present invention.

In the ATSC broadcasting system, a device for transmitting a broadcasting signal includes a service multiplexer and a transmitter.

Here, the service multiplexer may be located at a studio of each broadcasting station and the transmitter may be located at one or more specific sites. A plurality of transmitters may share the same frequency. In this case, the plurality of transmitters transmits the same signal. The service multiplexer multiplexes main service data for fixed reception and mobile service data for mobile reception. The transmitter modulates the multiplexed broadcasting data and transmits the modulated broadcasting data. Hereinafter, for convenience of description, a method for modulating the main service data for fixed reception and the mobile service data for mobile reception is called a mobile VSB (MVSB) If the broadcasting data for mobile reception is transmitted, the transmitter modulates the mobile service data for mobile reception such that the data can be stably received, regardless of various distortions or noise which may occur in a transmission channel.

A broadcasting signal receiver can compensate for the signal distortions and restore the broadcasting signal. Data communication between the service multiplexer and the transmitter, both of which are separated from each other, may be performed by various methods. For example, the standard such as synchronous serial interface for transport of MPEG-2 data (SMPTE-310M) may be used.

Figure 5:
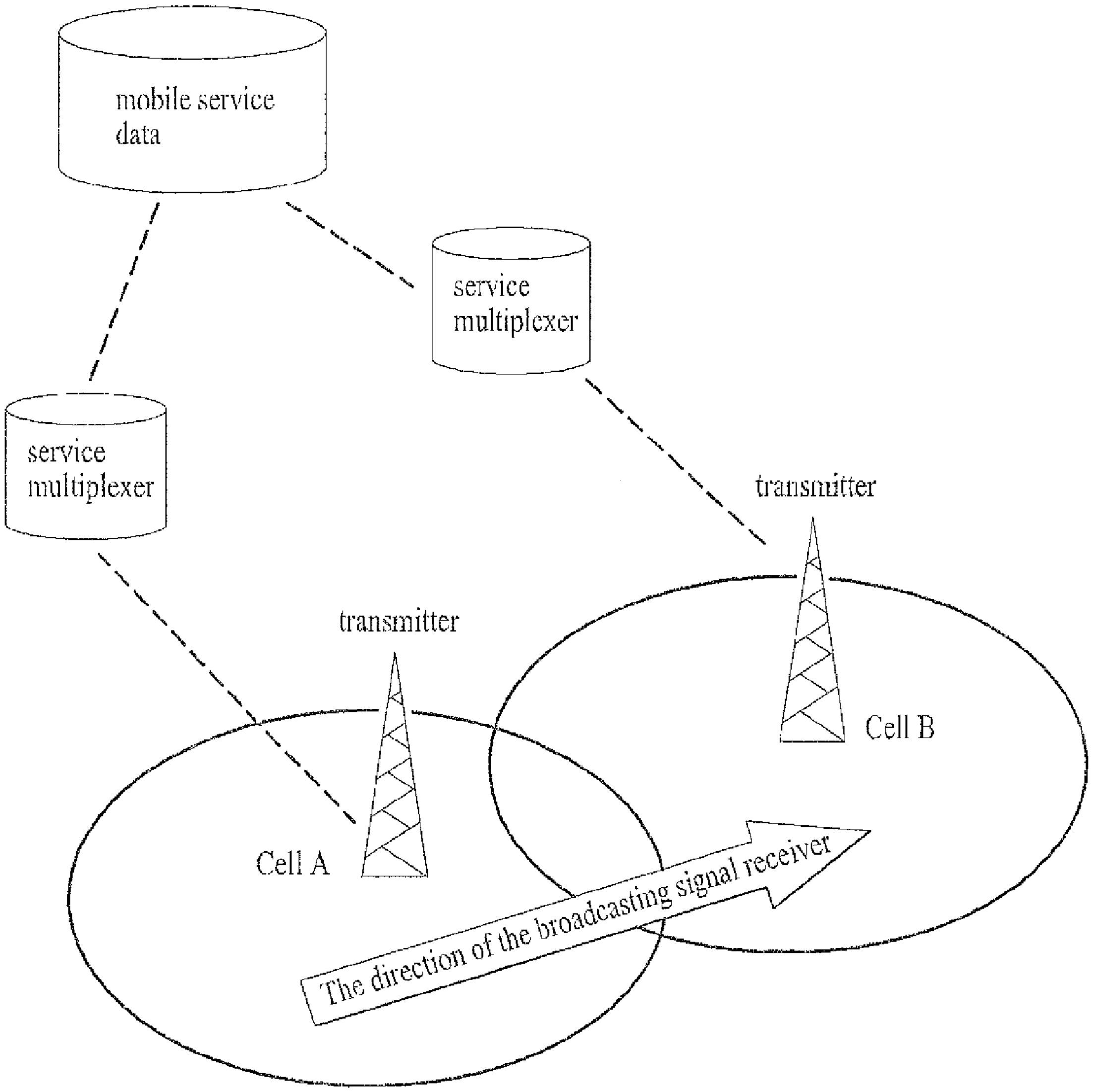
FIG. 5 is a schematic view illustrating the operation of the broadcasting signal receiver.

FIG. 5 is a schematic view illustrating the operation of the broadcasting signal receiver. For convenience of description, hereinafter, a range which is influenced by a transmission system according to one frequency in the MFN environment is called a cell. According to the present embodiment, even when the broadcasting signal receiver receives the broadcasting signal while moving over several cells, a viewer can continuously view the broadcasting program of the channel which has been received. The broadcasting signal receiver can receive the broadcasting signal from a current cell A and then receive the broadcasting signal from another cell B, that is, can change a cell for receiving the broadcasting signal. Hereinafter, this is called handover.

A mobile service elementary stream (ES) for mobile reception may be transmitted through transmitters with different area-based frequencies. If the mobile service ES for mobile reception is transmitted, the cell from which the broadcasting signal receiver receives the broadcasting signal and the physical information of the channel of the cell are changed. However, although the user does not perform an additional operation such as the tuning of the channel, the broadcasting signal of the same channel may be output. The cell can be identified by a cell ID. In each cell, any ES may be transmitted through different physical channels.

Table 1 shows the broadcasting information and the locations of the transmitters according to the cell ID.

TABLE 1

| Cell ID | 0x0001 | 0x0002 |
|---|---|---|
| Location | Mt. Gwanak | Mt. Yongmoon |
| Broadcasting information: channel name (major, physical) | MBC (11, 15)<br>ABC1 (9, 14)<br>ABC2 (7, 13)<br>SBB (6, 16)<br>ESS (10, 29) | MBC (11, 14)<br>ABC1 (9, 21)<br>ABC2 (7, 22)<br>SBB (6, 12)<br>ESS (10, 25) |

In the example of Table 1, a cell having a cell ID of 0x0001 is located at Mt. Gwanak and a cell having a cell ID of 0x0002 is located at Mt. Yongmoon. The same broadcasting signal can be transmitted through different physical channels according to the cell.

Figure 6:
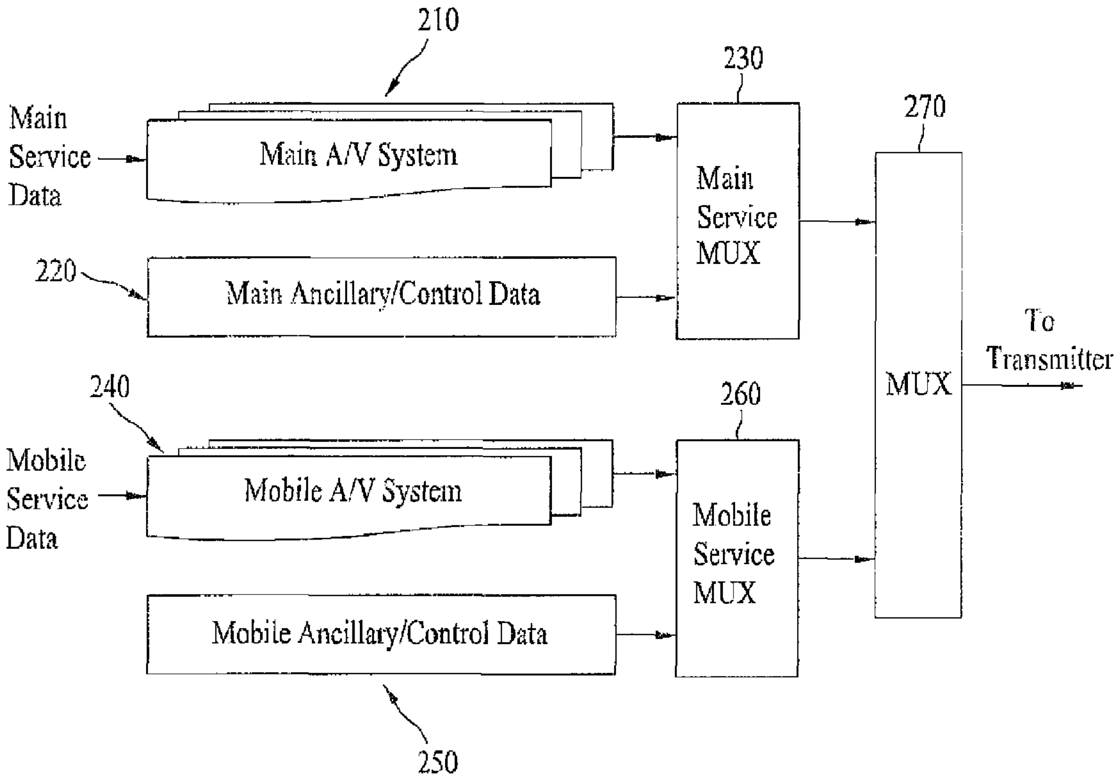
FIG. 6 is a view showing an example of a service multiplexer shown in FIG. 4.

FIG. 6 is a view showing an example of the service multiplexer shown in FIG. 4 in the broadcasting signal receiver according to the embodiment. The service multiplexer shown in FIG. 6 includes a main audio/video (A/V) system 210, main ancillary/control data system 220, a mobile A/V system 240, a mobile ancillary/control data system 250, a main service multiplexer 230, a mobile service multiplexer 260 and a transmission service multiplexer 270.

Main service data is encoded and compressed by the main A/V system 210 and is output to the main service multiplexer 230. If the number of types of main service data is greater than one, a plurality of main A/V systems may be included. The main service multiplexer 230 multiplexes the output of the main A/V system 210 and various types of additional data 220 of the main service and outputs the multiplexed data to the transmission service multiplexer 270.

Similarly, mobile service data is encoded and compressed by the mobile A/V system 240 and is output to the mobile service multiplexer 260. If the number of types of mobile service data is greater than one, a plurality of mobile A/V systems may be included. The mobile service multiplexer 260 multiplexes the output of the mobile A/V system 240 and various types of additional data of the mobile service and outputs the multiplexed data to the transmission service multiplexer 270.

The transmission service multiplexer 270 multiplexes the output of the main service multiplexer 230 and the output of the mobile service multiplexer 260 and outputs the multiplexed data to the transmitter. The output data of the transmission service multiplexer 270 may be expressed in the form of an MPEG-2 transport stream (TS) packet.

The transmission service multiplexer 270 can transmit the service data to the transmitter at a constant data rate. The transmission service multiplexer 270 can transmit the service data to the transmitter at a constant data rate even when the service data transmitted to the transmitter includes only the main service data or both the main service data and the mobile service data. For example, if the transmission service multiplexer 270 transmits the data to the transmitter at 19.39 Mbps, the mobile service data is multiplexed with the main service data and is transmitted within 19.39 Mbps. The mobile service data may be subjected to be error correction coding process in the transmitter and thus the data rate of the mobile service data may be reduced in consideration of the error correction encoding process.

If the output of the service multiplexer needs to be maintained at the constant data rate, for example, 19.39 Mbps, at least one of the main service multiplexer, the mobile service multiplexer and the transmission data multiplexer may insert null data or null packet in the multiplexed data so as to match the data rate of the final output to the constant data rate. Here, the null data may be generated in the multiplexer or may be received from an external device.

Figure 7:
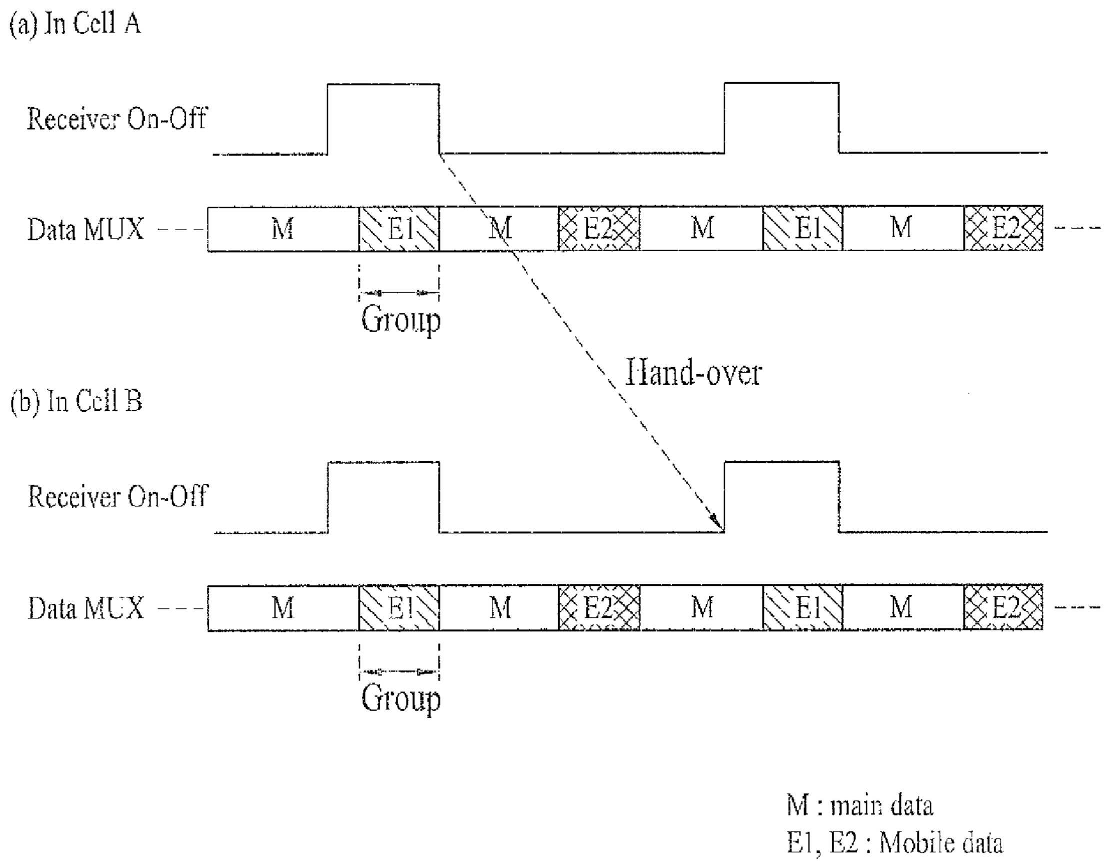
FIG. 7 is a view illustrating reception of broadcasting data at the time of occurrence of the handover, by the method for transmitting/receiving the broadcasting signal according to the embodiment.

FIG. 7 is a view illustrating reception of broadcasting data at the time of occurrence of the handover, by the method for transmitting/receiving the broadcasting signal according to the embodiment. Transmission data obtained by multiplexing the main service data M and mobile service data E1 and E2 may be transmitted to each cell. The main service data and the mobile service data may be multiplexed on a time axis and may be transmitted in the form of a burst, and desired broadcasting service data can be obtained by turning on/off the receiver only in a time period when the desired broadcasting service data is transmitted. For example, if broadcasting data E1 is obtained in the cell A, the signal is received only in a time period when the broadcasting data E1 is transmitted. In time periods when the main service data and the broadcasting data E2 are received, the power of the receiving unit of the broadcasting signal receiver is turned off. In the case where the broadcasting signal receiver is turned on/off in order to receive the signal, the broadcasting signal receiver is turned on/off earlier than an actual reception period such that a tuner or a demodulator prepares for the signal reception. Even when the broadcasting signal receiver receives the broadcasting data E1 in the cell B, the similar operation with that of the cell A may be performed.

In the case where the broadcasting signal receiver receives the broadcasting data E1 while moving over a plurality of cells, the broadcasting signal receiver can continuously receive the same broadcasting data (for example, E1) although the handover occurs in the broadcasting signal receiver.

Figure 8:
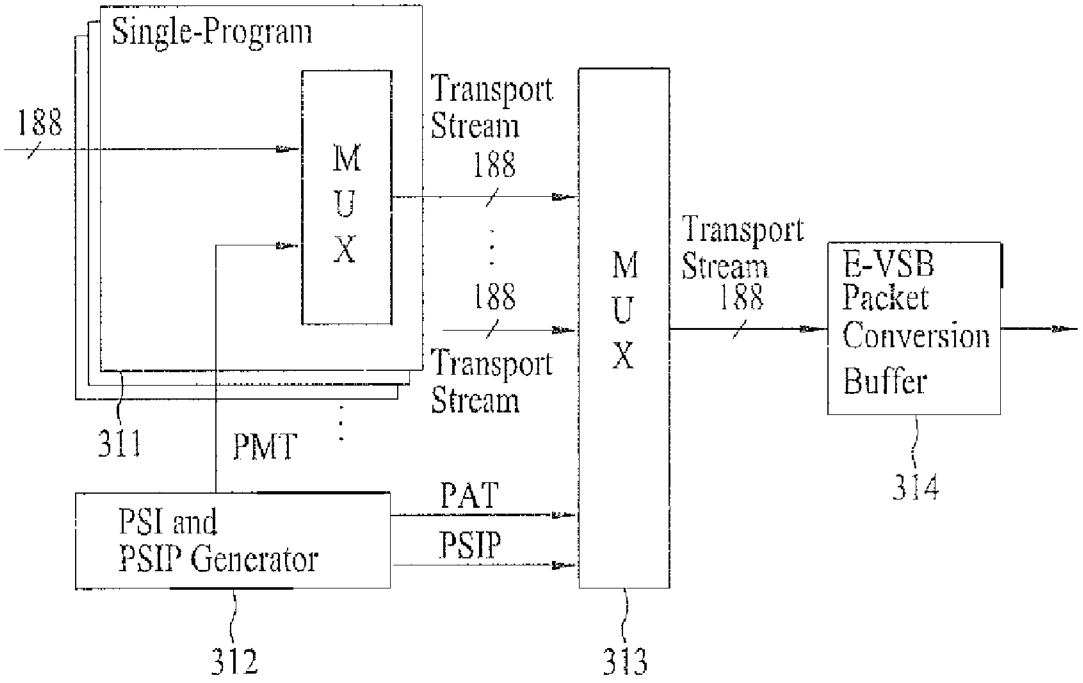
FIG. 8 is a view showing an example of a mobile service multiplexer of the service multiplexer shown in FIG. 6.

FIG. 8 is a view showing an example of a mobile service multiplexer of the service multiplexer shown in FIG. 6. The mobile service multiplexer shown in FIG. 8 includes a first multiplexer 311, a program table information generator 312, a second multiplexer 313 and a packet conversion buffer 314.

The first multiplexer 311 multiplexes mobile data of an MPEG-2 TS format and program table information, such as a program map table (PMT), generated by the program table information generator 312 and outputs the multiplexed data to the second multiplexer 313. The program table information generator 312 generates information according to program specific information (PSI) or program and system information protocol (PSIP). The PSI includes information such as the PMT, a program association table (PAT) and a network information table (NIT) and the PSIP includes a system time table (STT), a rating region table (RRT), a master guide table (MGT), a virtual channel table (VCT), an event information table (EIT) and an extended text table (ETT). Hereinafter, the information on the broadcasting signal which is transmitted in the form of at least one section, such as the PSI/PSIP, is called the program table information. The program table information generator 312 can transmit physical channel information of the cells in addition to a cell, which currently receives the signal, by the program table information. Hereinafter, for convenience of description, it is assumed that the physical channel information of the cells is included in the program table information called the NIT.

The second multiplexer 313 multiplexes the output of the first multiplexer 311 and the output of the program table information generator 312 and outputs the multiplexed signal to the packet conversion buffer 314. The first multiplexer 311 includes a plurality of multiplexers for multiplexing plural pieces of mobile service data and the PMT of the data. Here, one mobile service data may become a single program. Information on a physical layer for real-time broadcasting, that is, information such as time slicing of a transmission signal and a burst length, may be included in the program table information. The packet conversion buffer 314 adjusts 188-byte transport stream output from the second multiplexer 313 to a block length required in a preprocessor which will be described later.

Figure 9:
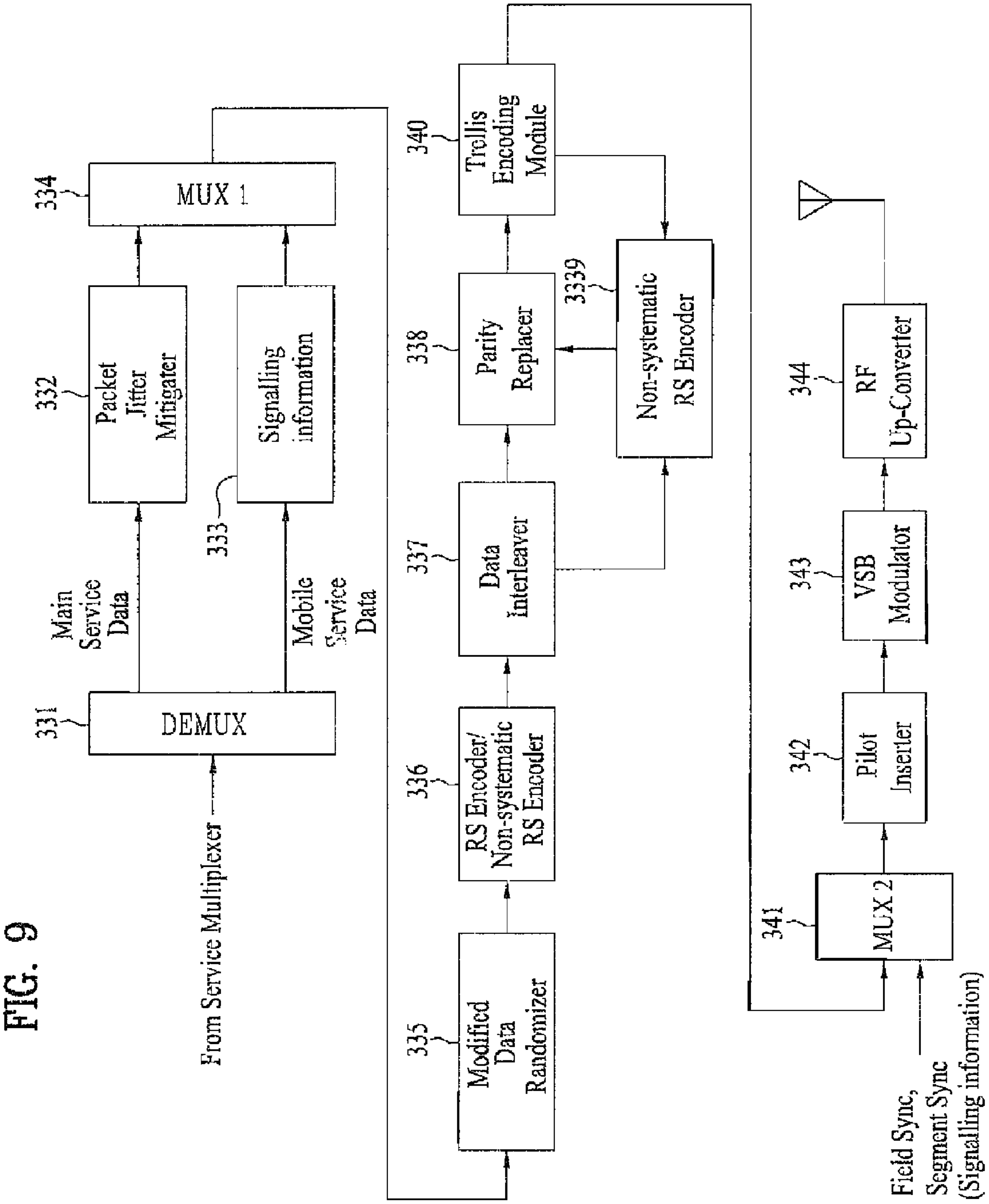
FIG. 9 is a block diagram showing an example of a transmitter shown in FIG. 4.

FIG. 9 is a block diagram showing an example of the transmitter shown in FIG. 4.

The transmitter includes a demultiplexer 331, a packet jitter mitigater 332, an M-VSB preprocessor 333, a first transmission data multiplexer 334, a data randomizer 335, an RS encoder/non-systematic RS encoder 336, a data interleaver 337, a parity replacer 338, a non-systematic RS encoder 339, a trellis encoding module 340, a second transmission data multiplexer 341, a pilot inserter 342, a VSB modulator 343, and an RF up-converter 344

The demultiplexer 331 of the transmitter demultiplexes the data received from the transmission service multiplexer 270, divides the data into the main service data and the mobile service data, outputs the divided main service data to the packet jitter mitigater 332, and outputs the mobile service data to the M-VSB preprocessor 333.

If the transmission service multiplexer 270 inserts the null data into the data and then transmits the data in order to match the data rate to the constant data rate, the demultiplexer 331 discards the null data by referring to the identifier which is transmitted together, processes only the remaining data, and outputs the processed data to a corresponding block. The demultiplexer 331 may set other information, such as control information necessary for transmission in the null data, and transmit the null data.

The M-VSB preprocessor 333 performs an additional encoding process with respect to the mobile service data in order to rapidly cope with noise and a channel variation. The mobile service data divided by the demultiplexer 331 is output to the M-VSB preprocessor 333. The M-VSB preprocessor 333 may randomize the mobile service data and perform an error correction coding process. If the M-VSB preprocessor 33 performs the randomizing process, the data randomizer 335 of the next stage may omit the randomizing process of the mobile service data. The randomizer of the mobile service data may be equal to or different from a randomizer defined in the ATSC.

The main service data packet and the mobile service data packet based on 188-byte units in data of a predetermined format output from the M-VSB preprocessor 333 are multiplexed according to a predefined multiplexing method and are output to the data randomizer 335. The multiplexing method can be adjusted by various variables of the system design.

In the method for multiplexing the data by the first transmission data multiplexer 334, as shown in FIG. 7, a burst period is provided on the time axis, a plurality of data groups may be transmitted in the burst period and only the main service data may be transmitted in a non-burst period. In contrast, the main service data may be transmitted in the burst period. That is, as shown in FIG. 7, a plurality of successive mobile service packets forms one data group and the plurality of data groups is mixed with the main service data packets so as to form one burst. The mobile service data or the main service data may be transmitted in one burst period.

The main service data may exist in the burst period or the non-burst period. The numbers of main data packets in the main service data period of the burst period and the main service data period of the non-burst period may be different from or equal to each other.

If the mobile service data is transmitted in the burst structure, the broadcasting signal receiver for receiving only the mobile service data is turned on only in the burst period so as to receive the data and is turned off in the period in which only the main service data is transmitted, thereby reducing the power consumption of the receiver.

The packet jitter mitigater 332 readjusts a relative location of the main service data packet such that overflow or underflow does not occur in the buffer of the decoder in the broadcasting signal receiver. Since the mobile service data group is multiplexed with the main service data in the packet multiplexing process, the temporal location of the main service packet is relatively changed. The decoder (for example, the MPEG decoder) of the device for processing the main service data of the broadcasting signal receiver may receive and decode only the main service data, recognize the mobile service data packet as the null packet, and discard the mobile service data packet. Accordingly, when the decoder of the broadcasting signal receiver receives the main service data packet multiplexed with the mobile service data group, packet jitter may occur.

Since the decoder of the receiver includes multi-stage buffers for video data and has a large size, the first transmission data multiplexer 334 may generate the packet jitter. Due to the packet jitter, overflow or underflow may occur in the buffer for the main service data of the broadcasting signal receiver, for example, the buffer for audio data.

The packet jitter mitigater 332 knows the multiplexing information of the first transmission data multiplexer 334. If it is assumed that the audio data packets are normally processed, the packet jitter mitigater 332 may rearrange the audio data packets of the main service as follows.

First, if one audio data packet is included in the main service data period of the burst period, for example, in the main service data period interposed between two mobile service data groups, the audio data packet is arranged at a foremost location of the main service data period, if two audio data packets are included in the main service data period of the burst period, the audio data packets are arranged at foremost and hindmost locations of the main service data period, and if at least three audio data packets are included in the main service data period of the burst period, two audio data packets are arranged at the foremost and hindmost locations of the main service data period and the remaining audio data packet is arranged therebetween at a uniform interval. Second, the audio data packet is arranged at a hindmost location in the main service data period before the start of the burst period. Third, the audio data packet is arranged at a foremost location in the main service data period after the completion of the burst period. The packets other than the audio data are arranged in a period excluding the locations of the audio data packets in input order.

If the locations of the main service data packets are relatively readjusted, a program clock reference (PCR) value is corrected. The PCR value is a time reference value for setting the time of the MPEG decoder, which is inserted into a specific area of a TS packet and is transmitted. The packet jitter mitigater 332 may correct the PCR value.

The output of the packet jitter mitigater 332 is input to the first transmission data multiplexer 334. The first multiplexer 334 multiplexes the main service data output from the packet jitter mitigater 332 and the mobile service data output from the M-VSB preprocessor 333 to the burst structure according to the predefined multiplexing rule and outputs the burst structure to the data randomizer 335.

The data randomizer 335 performs the same randomizing process as the existing randomizer if the received data is the main service data packet. That is, a sync byte in the main service data packet is discarded and the remaining 187 bytes are randomized using a pseudo random byte generated therein and are output to the RS encoder/non-systematic RS encoder 336.

However, if the received data is the mobile service data packet, the data randomizer 335 may discard the sync byte of 4-byte MPEG header included in the mobile service data packet and randomize the remaining 3 bytes. The remaining mobile service data excluding the MPEG header is output to the RS encoder/non-system RS encoder 336, without being randomized. In this case, the randomizing process is previously performed by the M-VSB preprocessor 333. Known data (or a known data location holder) included in the mobile service data packet and an initialization data location holder may be randomized or may not be randomized.

The RS encoder/non-systematic RS encoder 336 performs RS encoding process with respect to the data randomized by the data randomizer 335 or bypassed data so as to add a 20-byte RS parity and then outputs the encoded data to the data interleaver 337. At this time, if the received data is the main service data packet, the RS encoder/non-system RS encoder 336 performs a systematic RS encoding process so as to add the 20-byte RS parity to the back of the 187-byte data, similar to an ATSC VSB system. If the received data is the mobile service data packet, the 20-byte RS parity obtained by performing the non-systematic RS encoding process is inserted at the parity byte location decided in the packet.

The data interleaver 337 performs a convolutional interleaving process in the unit of bytes. The output of the data interleaver 337 is input to the parity replacer 338 and the non-systematic RS encoder 339.

The memory of the trellis encoding module 340 may be first initialized such that output data of the trellis encoding module 340 located at the next stage of the parity replacer 338 is set to known data defined by the agreement between the transmitter and the receiver. The memory of the trellis encoding module 340 is first initialized before the received known data sequence is trellis-encoded.

If a start part of the received known data sequence is the initialization data location holder inserted by the M-VSB preprocessor 333, initialization data is generated and is replaced with the trellis memory initialization data location holder immediately before the received known data sequence is trellis-encoded.

The value of the trellis memory initialization data is decided and generated according to the memory status of the trellis encoding module 340. Due to the influence of the replaced initialization data, the RS parity may be calculated again and may be replaced with the RS parity output from the data interleaver 337.

The non-systematic RS encoder 339 receives the mobile service data packet including the initialization data location holder, which will be replaced with the initialization data, from the data interleaver 337 and receives the initialization data from the trellis encoding module 340. The initialization data location holder of the received mobile service data packet is replaced with the initialization data, the RS parity data added to the mobile service data packet is removed, and a new non-systematic RS parity is calculated and is output to the parity replacer 338. Then, the parity replacer 338 selects the output of the data interleaver 337 with respect to the data in the mobile service data packet, selects the output of the non-systematic RS encoder 339 with respect to the RS parity, and outputs the selected data to the trellis encoding unit 340.

If the main service data packet is received or if the mobile service data packet no including the initialization data location holder to be replaced is received, the parity replacer 338 selects and outputs the RS parity and the data output from the data interleaver 337 to the trellis encoding module 340 without alteration.

The trellis encoding module 340 converts the data based on byte units into the data based on symbol units, performs 12-way interleaving, performs the trellis encoding process, and outputs the encoded data to the second transmission data multiplexer 341.

The second transmission data multiplexer 341 inserts a field sync signal and a segment sync signal to the output of the trellis encoding module 340 and outputs the inserted data to the pilot inserter 342. The data into which the pilot is inserted by the pilot inserter 342 is VSB-modulated by the VSB modulator 343 and is transmitted to the broadcasting signal receiver through the RF up-converter 343.

The transmitter transmits various transmission parameters of the transmission signal such as the main service data or the mobile service data and the broadcasting signal receiver needs to receive the transmission parameters of the transmitted signal in order to normally receive the transmitted signal. For example, in order to transmit the mobile service data, information indicating how the signals of the symbol area are encoded is required and information indicating how the main service data and the mobile service data are multiplexed is required. A cell identifier may be required in the multi frequency network environment. Here, information on the transmission parameter is called signaling information. In the embodiment shown in FIG. 9, the signaling information may be inserted by the preprocessor 333 or the second transmission data multiplexer 341 so as to be transmitted. If the second transmission data multiplexer 341 inserts the signaling information, the signaling information may be inserted into a field sync segment area.

Figure 10:
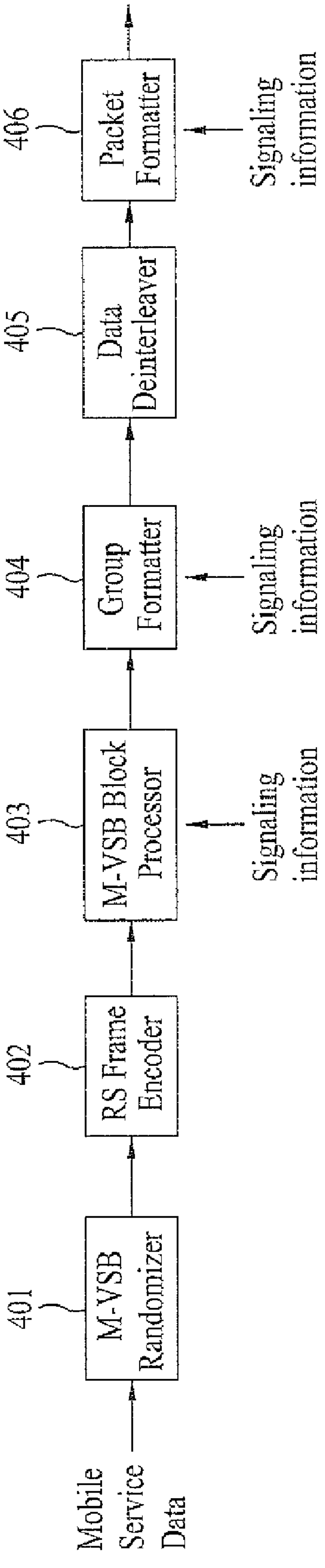
FIG. 10 is a view showing an example of a preprocessor shown in FIG. 9.

FIG. 10 is a view showing an example of the preprocessor shown in FIG. 9. The preprocessor shown in FIG. 9 may include an M-VSB data randomizer 401, a RS frame encoder 402, an M-VSB block processor 403, a group formatter 404, a data deinterleaver 405 and a packet formatter 406.

The M-VSB randomizer 401 randomizes the received mobile service data and outputs the randomized data to the RS frame encoder 402, for error correction encoding. If the M-VSB randomizer 401 randomizes the mobile service data, the data randomizer 335 located at the next stage thereof may omit the randomizing process of the mobile service data.

The RS frame encoder 402 performs the error correction encoding process with respect to the randomized mobile service data. If the RS frame encoder 402 performs the error correction encoding process, burst error which may occur by a variation in propagation environment is distributed while making the mobile service data robust so as to cope with the propagation environment which rapidly varies. The RS frame encoder 402 may include a process of mixing mobile service data having a predetermined size in the unit of data rows.

Hereinafter, as one embodiment, the error correction encoding process may be performed by performing the RS encoding method or the cyclic redundancy check (CRC) encoding method. If the RS encoding method is performed, parity data which will be used for error correction is generated and, if the CRC encoding method is performed, CRC data which will be used for error detection is generated.

The RS encoding method may use a forward error correction (FEC) structure. The CRC data generated by the CRC encoding process may indicate whether the mobile service data is damaged by the error while being transmitted through the channel. The error correction encoding process may use other error detection encoding methods other than the CRC encoding method. Alternatively, the overall error correction capability of the receiver can be increased using the error correction encoding method. The mobile service data encoded by the RS frame encoder 402 is input to the M-VSB block processor 403.

The M-VSB block processor 403 encodes the received mobile service data at G/H encoding rate again and outputs the encoded data to the group formatter 404. The M-VSB block processor 403 separates the received mobile service data based on the byte units into data based on bit units, encodes the separated G-bit data to H-bit data, converts the data into data based on byte units, and outputs the data based on byte units. For example, if 1-bit input data is encoded to 2-bit data and the 2-bit data is output, G becomes 1 and H becomes 2. If 1-bit input data is encoded to 4-bit data and the 4-bit data is output, G becomes 1 and H becomes 4. In the present invention, for convenience of description, the former case is called encoding of ½ encoding rate (also called ½ encoding) and the latter case is called encoding of ¼ encoding rate (also called ¼ encoding) The ¼ encoding has higher error correction capability than the ½ encoding. Accordingly, the group formatter 404 may allocate the data encoded at the ¼ encoding rate to an area having low reception capability and allocate the data encoded at the ½ encoding rate to an area having high reception capability, thereby reducing a difference in reception capability.

The M-VSB block processor 403 may receive the signaling information included in the transmission parameter information. The data containing the signaling information may be subjected to the ½ encoding or the ¼ encoding. The signaling information is the information necessary for receiving and processing the data included in the data group by the broadcasting signal receiver and may include cell identifier information, data group information, multiplexing information and burst information.

The group formatter 404 inserts the mobile service data output from the M-VSB block processor 403 into a corresponding area in the data group formed according to a predetermined rule. In conjunction with the data deinterleaving, various types of location holders or known data may be inserted into the corresponding area in the data group. The data group may be separated into at least one layered area and the type of the mobile service data inserted into each area may vary according to the characteristics of the layered area. For example, each layered area may be classified according to the reception capability within the data group.

The group formatter 404 may insert the signaling information such as the transmission parameter information into the data group independent of the mobile service data. When the generated known data is inserted into the corresponding area of the mobile service data group, the group formatter 404 may insert the signaling information into at least a portion of the area into which the known data can be inserted, instead of the known data. For example, if a long known data sequence is inserted into the start part of a body area of the mobile service data group, the signaling information is inserted into a portion of the start part, instead of the known data. In this case, a portion of the known data sequence inserted into the remaining area excluding the area, into which the signaling information is inserted, may be used for capturing the start point of the mobile service data group and the other portion may be used for channel equalization in a reception system.

The group formatter 404 may insert an MPEG header location holder, a non-systematic RS parity location holder and a main service data location holder in conjunction with the data deinterleaving of the next stage, in addition to the encoded mobile service data output from the M-VSB block processor 403.

The reason why the main service data location holder is inserted is because an area in which the mobile service data and the main service data are mixed exists on the basis of the data after the data interleaving. For example, the location holder for the MPEG header is allocated to the foremost location of each packet on the basis of the output data after the data deinterleaving.

The group formatter 404 may insert the known data generated by a predetermined method or insert the known data location holder for inserting the known data later. The location holder for initialization of the trellis encoding module may be inserted into a previous area of the known data sequence. The size of the mobile service data which can be inserted into one data group may vary according to initialization of the trellis inserted into the data group or the size of the known data, the MPEG header and the RS parity.

The data deinterleaver 405 deinterleaves the data and the location holder in the data group output from the group formatter 404 as the inverse process of the interleaving and outputs the deinterleaved data to the packet formatter 406.

The packet formatter 406 may remove the main service data location holder and the RS parity location holder allocated for the deinterleaving, add 1-byte MPEG sync signal to a 3-byte MPEG header location holder with respect to the remaining data portions, and insert a 4-byte MPEG header.

If the group formatter 404 inserts the known data location holder, the packet formatter 406 may include actual known data to the known data location holder and output the known data location holder without adjustment. Then, the packet formatter 406 divides the data in the packet-formatted data group into mobile service data packets (that is, the MPEG TS packets) based on 188-byte units and outputs the divided data to the multiplexer. The packet formatter 406 may insert the signaling information into at least a portion of the known data area instead of the known data and output the inserted data. If the known data location holder is inserted into the start part of the body area of the mobile service data group, the signaling information may be inserted into a portion of the known data location holder.

If the signaling information is inserted, the inserted signaling information may be block-encoded for a short period and may be inserted or a predefined pattern may be inserted according to the signaling information. The body areas of the mobile service data group may have different known data patterns. Accordingly, in the reception system, only symbols in a promised period may be divided from the known data sequence and be recognized as the signaling information.

FIGS. 8 to 10 show the example of transmitting the broadcasting signal of which mobile reception is possible. Hereinafter, a method for transmitting/receiving a broadcasting signal when a broadcasting signal receiver changes a cell and receives the broadcasting signal will be described.

The method for transmitting/receiving the broadcasting signal according to the present embodiment can include a cell identifier in signaling information and transmit/receive the signaling information. Information on a cell for receiving a current broadcasting signal and the other cells, for example, information on a current cell and adjacent cells, may be set in program table information and may be transmitted/received.

The broadcasting signal receiver may determine whether the cell for receiving the broadcasting signal is changed, from the power of the reception signal. If the cell is changed, the broadcasting signal receiver may obtain channel information from the changed cell using the program table information and output the program of the same channel before and after the cell is changed.

Figure 11:
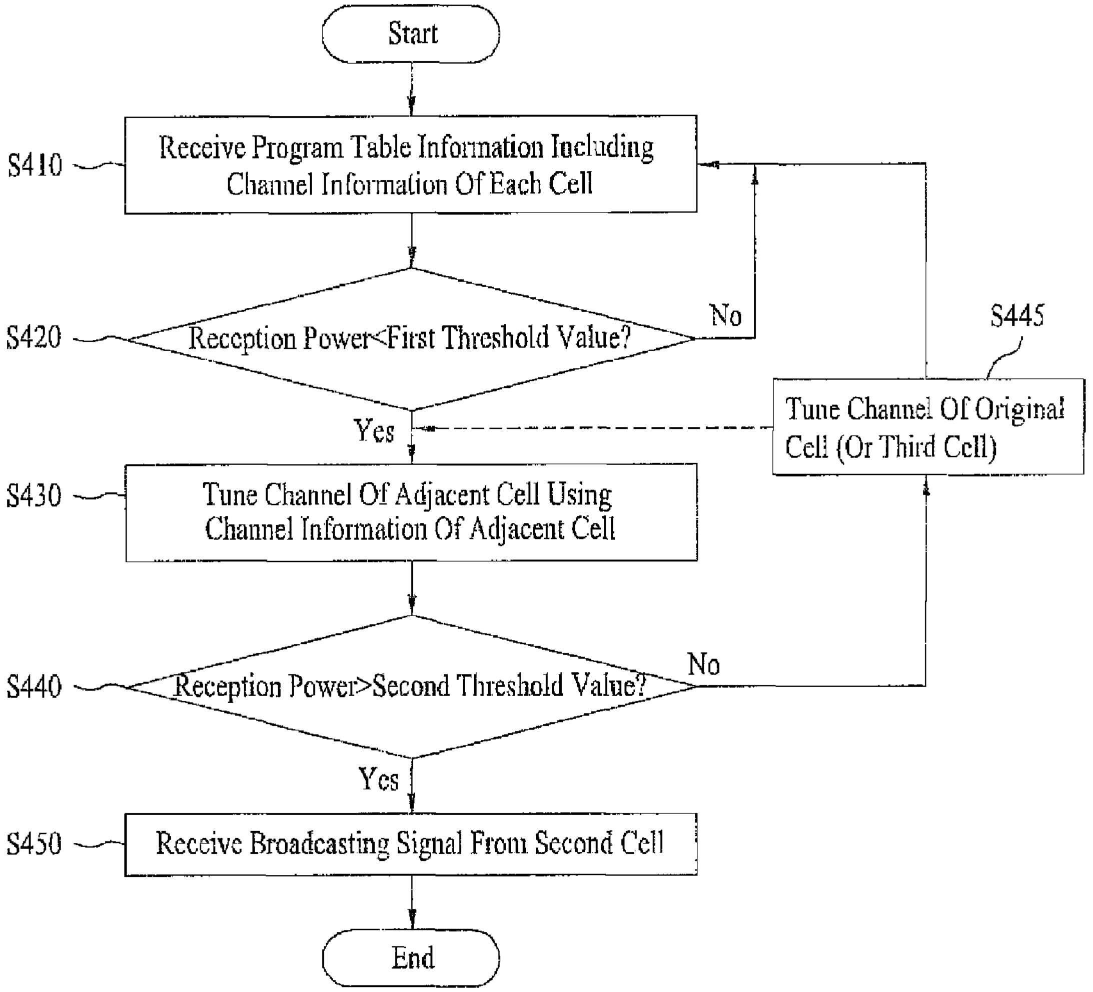
FIG. 11 is a flowchart illustrating a method for transmitting/receiving a broadcasting signal according to an embodiment.

FIG. 11 is a flowchart illustrating a method for transmitting/receiving a broadcasting signal according to an embodiment. The method for transmitting/receiving the broadcasting signal according to the embodiment will be described with reference to FIG. 11. It is assumed that the broadcasting receiver outputs a broadcasting program of any channel received from a first cell.

The broadcasting signal receiver receives and parses the program table information including the channel information of cells from the first cell and obtains the channel information of the first cell and the other cells (S410). If the broadcasting signal receiver moves over the cells, the broadcasting signal receiver may move from the current cell to a cell adjacent thereto. The program table information is called a network information table (NIT) for convenience. The NIT may include the channel information, for example, physical channel information, of at least one cell. The NIT will be described in detail with reference to FIG. 12. The broadcasting signal can be received in a burst period of the signal.

The broadcasting signal receiver can receive the broadcasting signal, in which the program table information and the mobile service data are multiplexed, from the first cell.

The broadcasting signal receiver determines whether reception power is less than a first threshold value (S420) and tries to tune the channel of the broadcasting signal transmitted with the frequency of an adjacent cell using the channel information of the adjacent cell (S430) if the reception power is less than the first threshold value. This step may perform in a reception off period of the broadcasting signal received from the first cell. The channel of the broadcasting signal transmitted with the frequency of a second cell which is the adjacent cell is tuned so as to obtain the identifier of the second cell from the broadcasting signal of the second cell. The identifier of the second cell may be obtained from the NIT information or the signaling information of the received broadcasting signal. The setting of the signaling information was described in detail with reference to FIG. 10.

It is determined whether the power of the signal received from the second cell is greater than a second threshold value (S440) and the broadcasting signal including the mobile service data and the program table information of the second cell is received from the second cell (S450) if the signal received from the second cell is greater than the second threshold value. If the program table information of the second cell is received and parsed, it is possible to obtain cell information including the channel information of the second cell which is the adjacent cell.

If it is determined that the power of the signal received from the second cell is less than the second threshold value in the step S440, the physical channel of the broadcasting signal of the first cell is tuned (S445). The channel tuning is preferably performed in the reception off period of the signal received from the first cell. In order to prevent the broadcasting signal from being cut off, the channel of the signal of the first cell is tuned again within the reception off period. Alternatively, if the reception off period is long, the step S430 may be performed in order to tune the signal of a third cell.

FIG. 12 shows the program table information including the physical channel information of each cell in the program table information transmitted according to the present embodiment. The physical channel information transmitted from each cell may be transmitted by the NIT of the PSI. The NIT includes the physical channel information of the current cell or the other cells and, if any broadcasting station transmits the broadcasting signal according to an MVSB modulation method, may include the physical channel information of the other broadcasting stations in addition to the broadcasting station. In the example shown in FIG. 12, the PID of the packet transmitted by the NIT is 0x010 and the table identifier (table_Id) is 0x40. FIG. 12 shows a case where only the channel information of two cells adjacent to the current cell is transmitted for convenience of description.

In the example shown in FIG. 12, the identifier of each cell and the physical channel information of each cell are included in cell-frequency-link_descriptor of network_descriptor( ). For example, the identifier (cell_id) of the first cell adjacent to the current cell is 0x0001, the frequency of the physical channel of the first cell is 0x03aefe40 (fc=618 MHz), the identifier of the second cell adjacent to the current cell is 0x0002, and the frequency of the physical channel of the second cell is 0x4a32240 (fc=778 MHz).

The example shown in FIG. 12 can provide the physical channel information of at least one cell identified by the identifier of the cell through a transport stream loop (TS loop) of the NIT. Service_list_descriptor( ) for providing the list information of the services according to the IDs of transport streams may be included in the TS loop. FIG. 12 shows an example of the physical channel information of each cell for the transport stream (identifier (transport_stream_identifier) is 0x901) transmitted from the first cell and the second cell adjacent to the current cell.

The NIT includes cell information including the physical channel information of the cell in a terrestrial delivery system descriptor (terrestrial_delivery_system_descriptor( )) of each cell. For example, the NIT may include information indicating through which physical channel any cell transmits a specific transport stream.

In the example shown in FIG. 12, with respect to the first cell for delivering the transport stream identified by 0x901, information on the central frequency (618 MHz; 0x03aefe40) of a transmission signal information, a bandwidth (6 MHz; 010), an indicator (time_slicing_indicator) indicating whether the signal can be received by a time slicing scheme according to burst signal transmission, a modulation method (modulation) indicating whether it is the mobile VSB, a value indicating a first error correction encoding rate (sccc_rate-HP_stream) of a high priority channel may be included. Information on a value indicating a first error correction encoding rate (sccc_rate-LP_stream) of a low priority channel, a value indicating a second error correction encoding rate (rs_code_rate-HP_stream) of the high priority channel, a value indicating a second error correction encoding rate (rs_code_rate-LP_stream) of the low priority channel and an identifier (other_frequency_flag) indicating whether the transport stream is transmitted with different frequencies may be included as the channel information of the first cell.

In the example shown in FIG. 12, information on the second cell for delivering the same transport stream (identifier 0x0901) as the first cell may include cell information including the physical channel information such as the central frequency (778 MHz; 0x04a32240) and the bandwidth (6 MHz; 010).

As shown in FIG. 12, the NIT transmitted from any cell includes information indicating through which physical channel of another cell all the transport streams transmitted from the cell are transmitted. The NIT transmitted from any cell may, for example, transmit the cell information including the physical channel information of the cells adjacent to the cell. Accordingly, if the handover of the broadcasting signal receiver occurs from the first cell to the second cell, although broadcasting contents which were received from the first cell are received from the second cell through another physical channel, the changed physical channel information can be obtained from the second cell and thus the same broadcasting contents can be output. At the time of the occurrence of handover, the user can continuously view the broadcasting contents of the same channel without additionally tuning the channel.

According to the present embodiment, the identifier of the cell can be identified according to the handover method shown in FIG. 11 and the channel information of the cell to which the broadcasting signal receiver is handed over can be obtained by referring to the program table information shown in FIG. 12. Accordingly, the broadcasting signal receiver can continuously output the broadcasting program of the same channel before and after the handover, although the broadcasting signal receiver moves over the cells.

Figure 13:
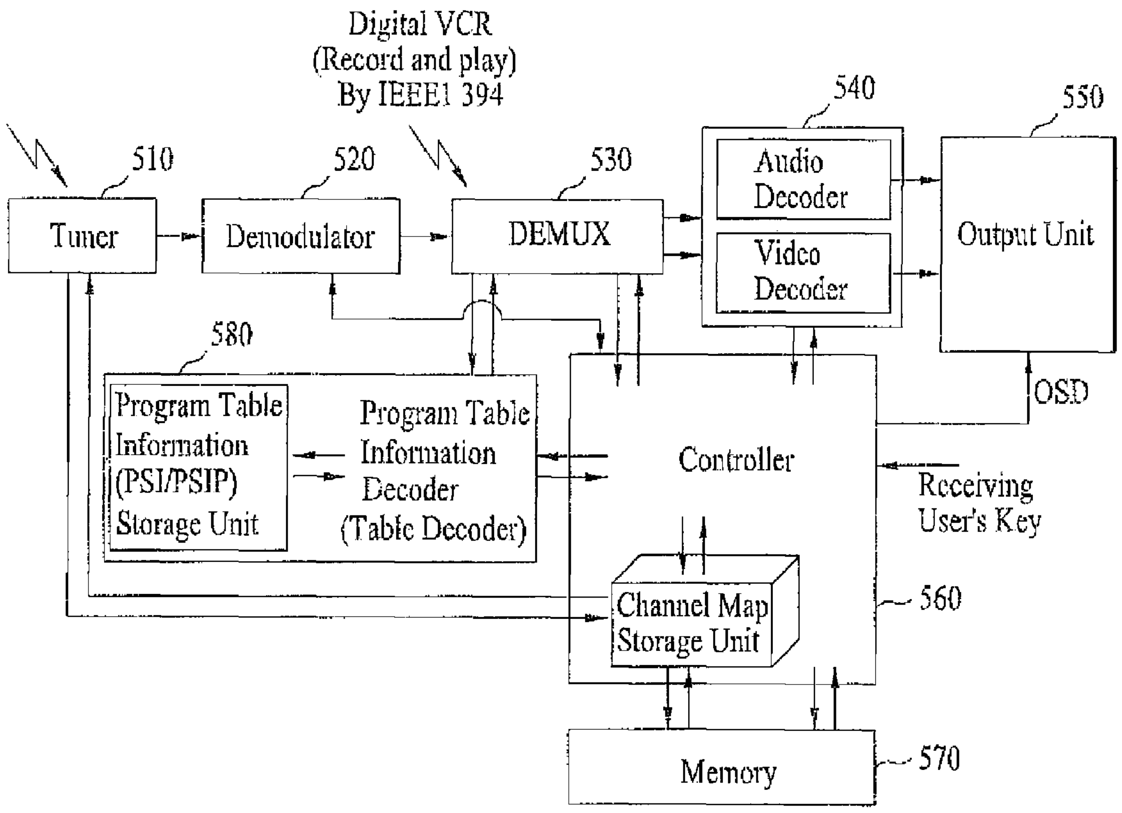
FIG. 13 is a view showing a broadcasting signal receiver according to an embodiment.

FIG. 13 is a view showing a broadcasting signal receiver according to an embodiment. The broadcasting signal receiver shown in FIG. 13 includes a tuner 510, a demodulator 520, a demultiplexer 530, a decoder 540, an output unit 550, a controller 560, a memory 570, and a program table information decoder 580.

The operation of the broadcasting signal receiver according to the present embodiment will be described with reference to FIG. 13.

The tuner 510 receives the broadcasting signal in which the identifier of the cell is set in the signaling information and selects and outputs the broadcasting signal of a channel according to a control signal of the controller 560 among the broadcasting signals received from the current cell.

The demodulator 520 may demodulate and output the received signal. The output signal may also include the signaling information including the identifier of the cell. The demodulator 520 will be described in detail with reference to FIG. 13.

The demultiplexer 530 may demultiplex program table information (PSI/PSIP) and an audio/video stream in the received signal. Alternatively, a broadcasting stream which will be recorded in or reproduced from a digital recording device may be received. For example, an input signal according to the IEEE1394 may be directly received without the tuner.

The decoder 540 may decode the audio/video broadcasting signal demultiplexed by the demultiplexer 530. The decoder 540 decodes the audio/video elementary stream packet and outputs the decoded audio/video signal to the output unit 550.

The output unit 550 receives and outputs the audio/video signal decoded by the decoder 540. The output unit 550 includes an on-screen-display (OSD) unit for outputting a graphic signal displayed on a display screen.

The program table information decoder 580 may decode the program table information demultiplexed by the demultiplexer 530 and temporarily store the decoded table information. The program table information decoder 580 may parse the program table information including the physical channel information of all the cells, that is, the NIT, acquire the physical information of all the cells, and output the information on the acquired cell to the controller 540.

The controller 560 includes an interface for receiving the control signal from the user. The controller 560 stores channel map information in which a physical channel and a virtual channel are mapped such that the tuner 510 selects the channel and controls the decoder 540 such that the broadcasting stream according to the channel request of the user is decoded and output. If the program table information decoder 580 parses the updated table information, the controller 560 stores the updated channel information in the channel map. The controller 560 may store other control information including information necessary for the handover of the broadcasting signal receiver, information on an application and the request information of the user in the memory 570.

The controller 560 determines whether the power of the signal tuned by the tuner 510 or the signal demodulated by the demodulator 520 is less than the first threshold value and controls the tuner 510 to tune the channel to the channel transmitted by a cell (for example, an adjacent cell) different from the current cell if the power of the signal is less than the first threshold value. In this case, the controller 560 may control the tuner 510 to tune the channel using the physical channel information of all the adjacent cells acquired from the parsed NIT information. The information included in the NIT was shown in FIG. 12.

When the tuner 510 tunes the channel with a specific frequency among the signals received from the cell (referred to as the second cell) adjacent to the current cell, the demodulator 520 may output the signaling information of the signal of the tuned channel. The controller 560 may obtain the identifier of the cell from the signaling information output from the demodulator 520 and identify from which cell the signal received currently is received The controller 560 determines whether the power of the signal received from the second cell is greater than the second threshold value and hands over from the previous cell to the second cell if the power of the signal is greater than the second threshold value. If so not, the broadcasting signal may be received from the previous cell again or the channel may be tuned to another cell (third cell). If the tuner 510 tunes the channel of the signal transmitted from the second cell, the controller 560 may control the tuner 510, the demodulator 520, the demultiplexer 530 and the decoder 540 such that the broadcasting signal of the channel received from the cell before the handover is output. That is, since the controller 560 can obtain information indicating, through which channel of the second cell the same broadcasting signal as the broadcasting signal of the channel received from the cell before the handover, from the parsed NIT information, the same broadcasting signal can be continuously output although the handover occurs.

The controller 560 may parse the NIT information from the signal received from the second cell to which the broadcasting signal receiver is handed over, obtain the physical channel information of the second cell and the cells adjacent to the second cell, and acquire the physical channel information of the cells according to the handover which may occur later in advance.

Figure 14:
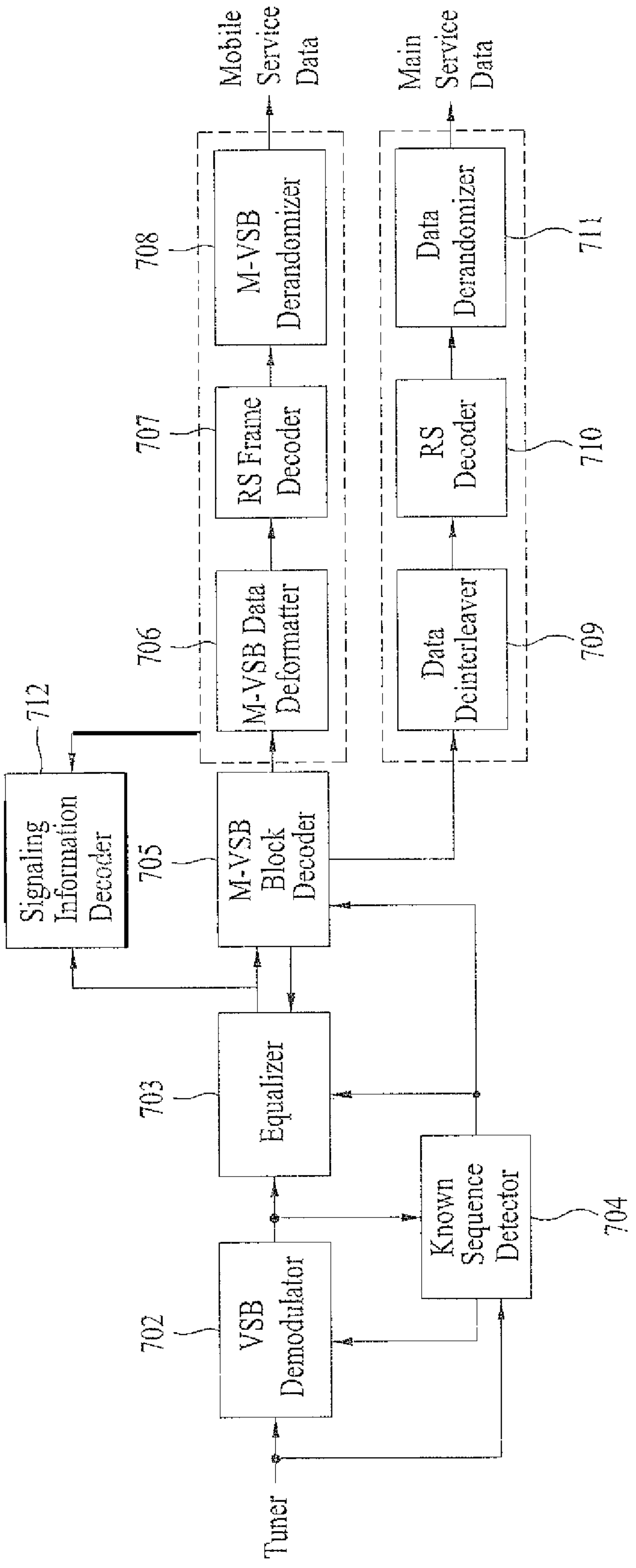
FIG. 14 is a view showing an example of a demodulator in the broadcasting signal receiver.

FIG. 14 is a view showing an example of the demodulator in the broadcasting signal receiver. Hereinafter, the demodulator of the present embodiment will be described with reference to FIG. 14.

The broadcasting signal receiver restores a carrier sync signal, restores a frame sync signal and performs channel equalization using the known data information inserted in the mobile service data period in a transmission system, thereby improving reception capability.

The broadcasting signal receiver includes a VSB demodulator 702, an equalizer 703, a known sequence detector 704, an M-VSB block decoder 705, an M-VSB data deformatter 706, a RS frame decoder 707, an M-VSB derandomizer 708, a data deinterleaver 709, a RS decoder 710, a data derandomizer 711, and a signaling information decoder 712. In FIG. 14, for convenience of description, the M-VSB data deformatter 706, the RS frame decoder 707, and the M-VSB derandomizer 708 are collectively called a mobile service data processor and the data deinterleaver 709, the RS decoder 710 and the data derandomizer 711 are collectively called a main service data processor.

The VSB demodulator 702 and the known sequence detector 704 receive the signal of which the frequency is tuned by the tuner and is down-converted into an intermediate frequency (IF).

The VSB demodulator 702 performs the automatic gain control, the recovery of a carrier and the restoration of a timing in consideration of the VSB method so as to convert the received IF signal to a baseband signal, and outputs the baseband signal to the equalizer 703 and the known sequence detector 704.

The equalizer 703 compensates for the distortion on the channel included in the demodulated signal and outputs the compensated signal to the M-VSB block decoder 705.

At this time, the known sequence detector 704 detects the location of known data inserted at the transmitter side from the input/output data of the VSB demodulator 702, that is, the data before the VSB demodulation or the data after the demodulation. The known sequence detector 704 outputs the location information and the symbol sequence of the known data generated at the location to the VSB demodulator 702 and the equalizer 703. The known sequence detector 704 outputs information for allowing the M-VSB block decoder 705 to distinguish the mobile service data, which is subjected to the additional error correction encoding at the transmitter side, and the main service data, which is not subjected to the additional error correction encoding, to the M-VSB block decoder 705. Although the connection state is not shown in FIG. 14, the information detected by the known sequence detector 704 can be used in the receiver and can be used in the M-VSB data deformatter 706 and the RS frame decoder 707.

The VSB demodulator 702 can improve demodulation capability using the known data symbol sequence at the time of the restoration of the timing or the recovery of the carrier and the equalizer 703 can improve equalization capability using the known data. The decoded result of the MVSB block decoder 705 may be fed back to the equalizer 703 so as to improve the equalization capability.

If the data received from the equalizer 703 is the mobile service data which is subjected to the additional error correction encoding and the trellis encoding at the transmitter side, the M-VSB block decoder 705 performs trellis decoding and additional error correction decoding as the inverse processes of the transmitter side. If the data is the main service data which is not subjected to the additional encoding and is subjected to the trellis encoding at the transmitter side, only the trellis decoding is performed.

The data group decoded by the M-VSB block decoder 705 is input to the M-VSB data deformatter 706 and the main service data packet is input to the data deinterleaver 709.

If the received data is the main service data, the M-VSB block decoder 705 may perform viterbi decoding with respect to the received data and output a hard decision value or a soft decision value.

If the received data is the mobile service data, the M-VSB block decoder 705 outputs the hard decision value or the soft decision value with respect to the received mobile service data. If the received data is the mobile service data, the M-VSB block decoder 705 decodes the data which is encoded by the M-VSB block processor and the trellis encoder of the transmission system. In this case, the RS frame encoder of the M-VSB preprocessor of the transmitter side may become an outer code and the M-VSB block processor and the trellis encoder may become an inner code. The decoder of the inner code may output the soft decision value such that the capability of the outer code can be maximized at the time of the decoding of the concatenated code.

Accordingly, the M-VSB block decoder 705 may output the hard decision value with respect to the mobile service data and preferably may output the soft decision value if necessary.

The data deinterleaver 709, the RS decoder 710 and the derandomizer 711 receive and process the main service data. The data deinterleaver 709 deinterleaves the main service data output from the MVSB block decoder 705 as the inverse process of the data interleaver of the transmitter side and outputs the deinterleaved data to the RS decoder 710.

The RS decoder 710 performs systematic RS decoding with respect to the deinterleaved data and outputs the decoded data to the derandomizer 711. The derandomizer 711 receives the output of the RS decoder 710, generates the same pseudo random byte as the randomizer of the transmitter, performs a bitwise exclusive OR (XOR) with respect to the pseudo random byte, inserts the MPEG sync data in front of every packet, and outputs 188-byte main service data in the packet units.

The data output from the M-VSB block decoder 705 to the M-VSB data deformatter 706 has a data group form. At this time, since the M-VSB data deformatter 706 already knows the configuration of the received data group, it is possible to distinguish the mobile service data and the signaling information having the system information within the data group. The signaling information indicates information for delivering the system information and can deliver the information on the transmission parameter including the identifier of the cell.

The mobile service data is output to the RS frame decoder 707 and the M-VSB data deformatter 706 removes the known data inserted into the data group and the main service data, the trellis initialization data, the MPEG header and the RS parity added in the RS encoder/non-systematic RS encoder or the non-systematic RS encoder of the transmission system and outputs the mobile service data to the RS frame decoder 707.

That is, the RS frame decoder 707 receives only the mobile service data which is subjected to the RS encoding and/or CRC-encoding, from the M-VSB data deformatter 706.

The RS frame decoder 707 performs the inverse process of the RS frame encoder of the transmission system, corrects errors in the RS frame, adds a 1-byte MPEG sync signal which is removed in the RS frame encoding process to the error-corrected mobile service data packet, and the added mobile service data to the M-VSB derandomizer 708.

The M-VSB derandomizer 708 performs the derandomizing process corresponding to the inverse process of the M-VSB randomizer of the transmission system with respect to the received mobile service data and outputs the derandomized data, thereby obtaining the mobile service data transmitted from the transmission system.

The signaling information decoder 712 may decode the signaling information included in the received signal. FIG. 14 shows an example of decoding the signaling information including the identifier of the cell from the M-VSB data deformatter 706 or the equalizer 703 according to the location of the signal carried in the signaling information.

Figure 15:
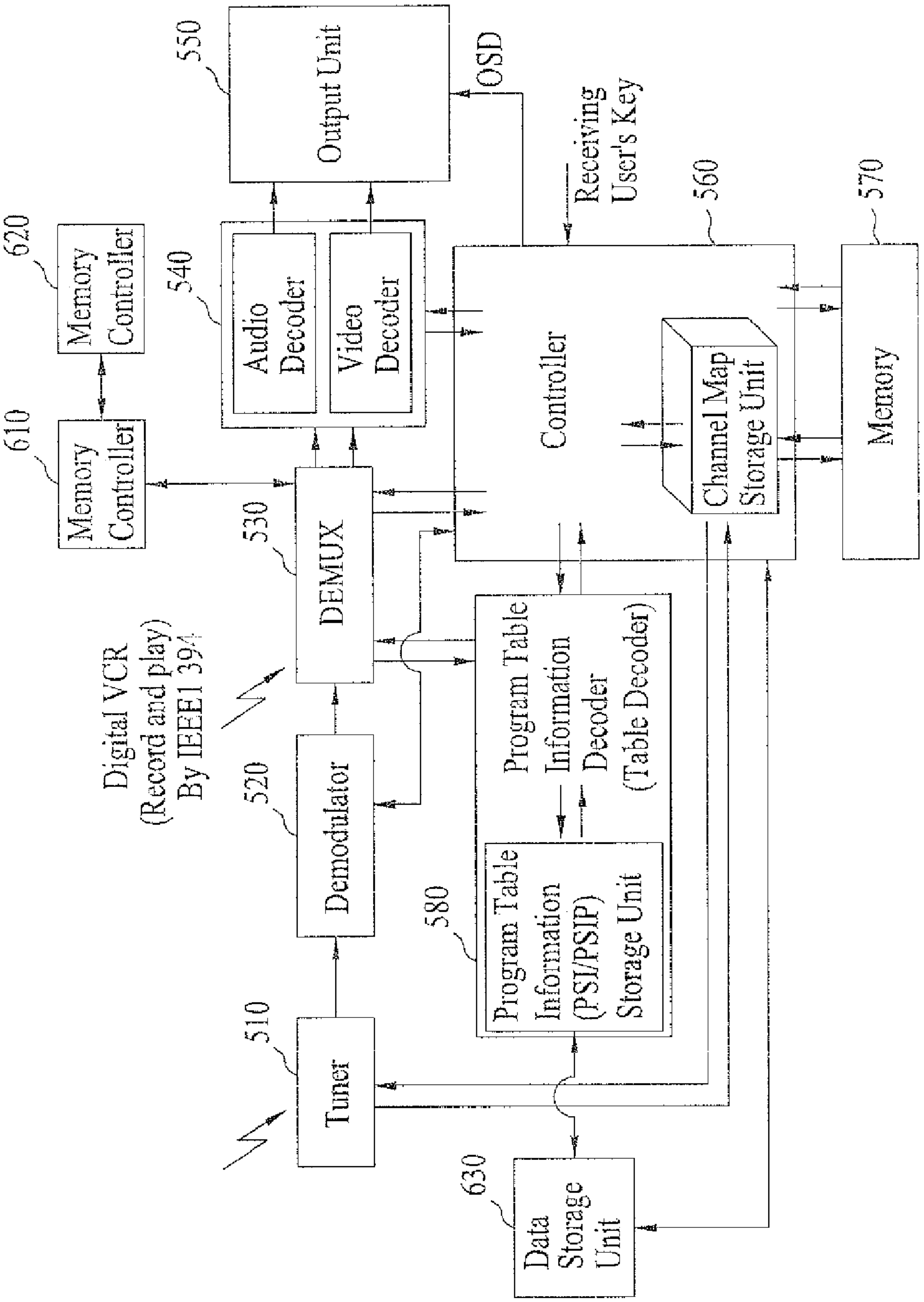
FIG. 15 is a view showing a broadcasting signal receiver according to another embodiment.

FIG. 15 is a view showing a broadcasting signal receiver according to another embodiment. Hereinafter, the operation of the broadcasting signal receiver according to the present embodiment will be described with reference to FIG. 15.

The broadcasting signal receiver according to the present embodiment further includes a second memory 620 for storing a program and a memory controller 610 for controlling the second memory 620, in addition to the memory 570 of the broadcasting signal receiver shown in FIG. 13.

The broadcasting service data demultiplexed by the demultiplexer 530 may be decoded by the decoder 540 and may be output and may be input to or read from the second memory 620 by the memory controller 610 for controlling the second memory 620. The demultiplexer 530 may store the main service data or the mobile service data demodulated by the demodulator 520 in the second memory 620.

The controller 560 may control an instant recording function, a reservation recording function, and a time shift function of the broadcasting service data demultiplexed by the demultiplexer 530 through the memory controller 610. The controller 560 may reproduce the broadcasting service data which is already stored in the second memory 620 through the memory controller 610 and the demultiplexer 530.

The second memory 620 may be divided into a temporary storage area for storing the data according to the time shift and a permanent storage area for permanently storing the data according to the selection of the user.

The memory controller 610 may control a play function, a fast forward function, a rewind function, a slow motion function and an instant replay function of the data stored in the second memory 620 according to the control signal of the controller 560. Here, the instant replay function is a function for repeatedly viewing a desired scene. The data which is currently being received in real time as well as the data which is previously stored can be instantly replayed in conjunction with the time shift function.

The memory controller 610 may scramble and store the received data in order to prevent the unauthorized copy of the data stored in the second memory 620. In contrast, the memory controller 610 may read, descramble and store the data which is scrambled and stored in the second memory 620.

If the broadcasting data for data broadcasting is included in the main service data or the mobile service data, the program table information decoder 580 may decode the broadcasting data. The data for data broadcasting may be decoded by the program table information decoder 580 and may be stored in a data storage unit 630.

If the controller 560 operates a data broadcasting application according to the request of the user, the program table information decoder 580 decodes the broadcasting data for data broadcasting and outputs the decoded broadcasting data. The application operated by the controller 560 may implement the data broadcasting output from the program table information decoder 580 and output it to the output unit 550.

The program table information decoder 580 may decode, for example, the service information such as DVB-SI or the broadcasting data according to the PSI or the PSIP. The broadcasting data for data broadcasting may be of a packetized elementary stream type or a section type. That is, the data for data broadcasting includes PES type data or section type data.

For example, the data for data broadcasting is included in a digital storage media-command and control (DSM-CC) section and the DSM-CC section may be composed of the TS packet based on 188-byte units. The identifier of the TS packet included in the DSM-CC section is included in the program table information which is a data service table (DST). If the DST is transmitted, 0x95 is allocated as the value of a stream_type field in the service location descriptor of the PMT or the VCT. The broadcasting signal receiver determines that the data for data broadcasting is received if the value of the stream-type field of the PMT or the VCT is 0x95. The data for data broadcasting may be transmitted by a data carousel method.

In order to process the data for data broadcasting, the demultiplexer 530 may perform section filtering under the control of the program table information decoder 580, discard the overlapping section, and output the non-overlapping section to the program table information decoder 580. The program table information decoder 580 can determine whether the data for data broadcasting included in the broadcasting signal is received according to the PID of the VCT. The PID of the VCT may be set in an MGT and have a fixed value.

The demultiplexer 530 may output only an application information table (AIT) to the program table information decoder 580 through the section filtering. The AIT includes information on an application executed on the broadcasting signal receiver, for the data service.

The AIT may include the information on the application, for example, the name of the application, the version of the application, the priority of the application, the ID of the application, the status of the application (auto-start, operability of the user, kill or the like) the type of the application (Java or HTML), the class of the application, the location of the stream including a data file, the base directory of the application, and the location of the icon of the application. Accordingly, information necessary for executing the application may be stored in the data storage unit 630 using the above-described information.

The application executed by the controller 560 may be received together with the broadcasting data and may be updated. A data broadcasting application manager which is executed in order to allow the controller 560 to execute the application may include a platform for executing an application program. The platform may be, for example, the Java virtual machine for executing the Java program.

If it is assumed that the data broadcasting service is a traffic information service, the broadcasting signal receiver can provide the service to the users through at least one of characters, voice, graphics, still images, moving images or the like although an electronic map or a global positioning system (GPS) module is not mounted. If the broadcasting signal receiver includes the GPS module, the data broadcasting application may be implemented after the GPS module extracts current location information (longitude, latitude, and altitude) received from a satellite. The data storage unit 630 of the broadcasting signal receiver 630 may store the electronic map including information on links and nodes and a variety of graphic information.

Figure 16:
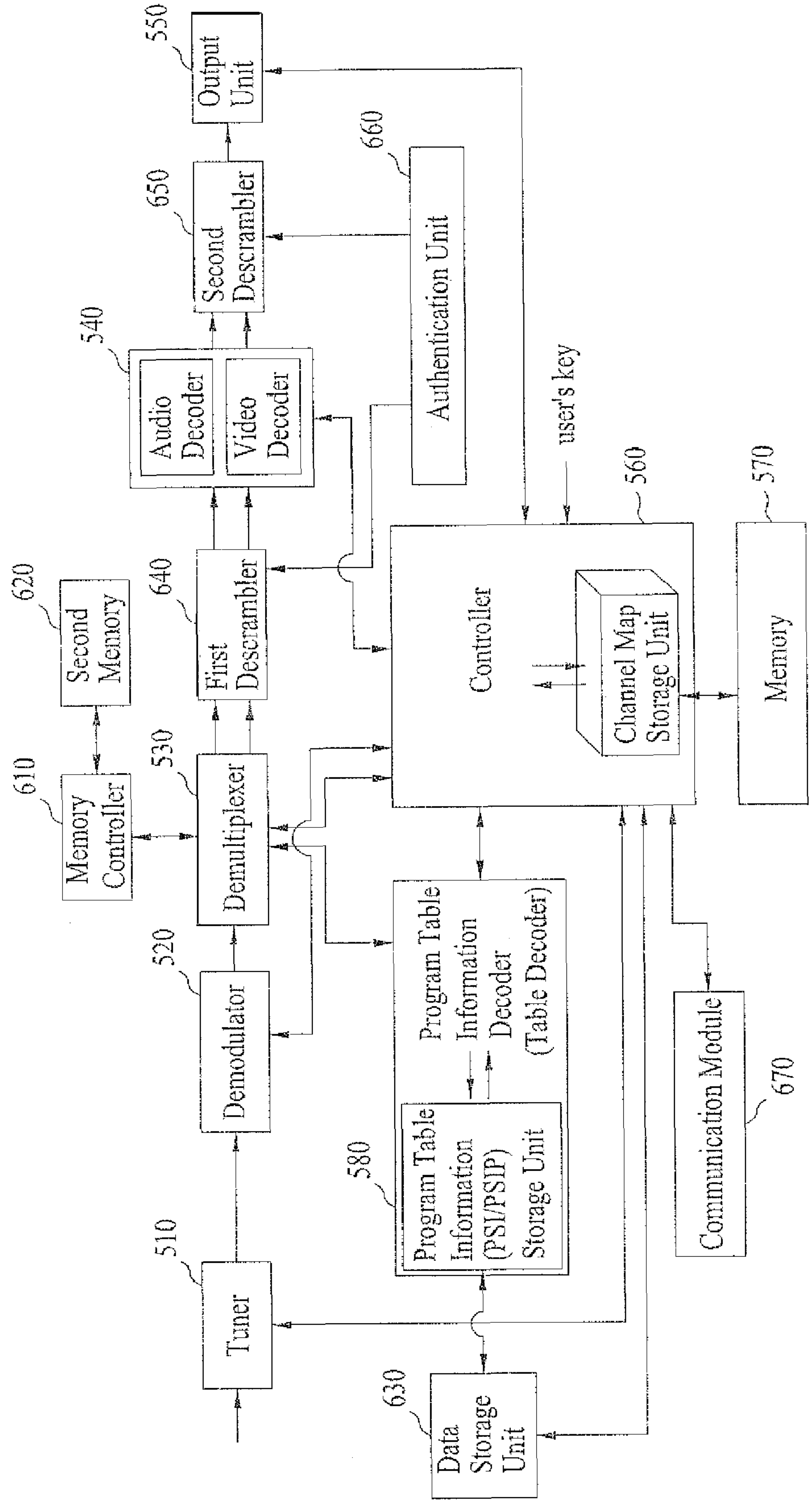
FIG. 16 is a view showing a broadcasting signal receiver according to another embodiment.

FIG. 16 is a view showing a broadcasting signal receiver according to another embodiment. Hereinafter, the operation of the broadcasting signal receiver according to the present embodiment will be described with reference to FIG. 16. The embodiment shown in FIG. 16 can process the scrambled reception signal.

The broadcasting signal receiver according to the embodiment shown in FIG. 16 further includes a first descrambler 640, a second descrambler 650 and an authentication unit 660, in addition to the embodiment shown in FIG. 15. Alternatively, in the embodiment shown in FIG. 16, any one of the first descrambler 640 and the second descrambler 650 may be included. The first descrambler 640 receives and descrambles the signal demultiplexed by the demultiplexer 530. At this time, the first descrambler 640 may receive and use the data necessary for descrambling and the authentication result from the authentication unit 660 in the descrambling. The decoder 540 receives and decodes the signal descrambled by the first descrambler 640 and outputs the decoded signal. If the embodiment shown in FIG. 16 does not include the first descrambler 640, the signal output from the decoder 540 may be descrambled by the second descrambler 650.

The broadcasting signal transmitter may scramble broadcasting contents and transmit the scrambled broadcasting contents in order to provide a service for preventing unauthorized copy or unauthorized viewing of the main service data or the mobile service data or a pay broadcasting service.

The broadcasting signal receiver descrambles the scrambled broadcasting contents and outputs the descrambled broadcasting contents. At this time, an authentication process may be performed by authentication means before the descrambling. In the embodiment shown in FIG. 16, the first descrambler 640, the second descrambler 650 and the authentication unit 660 may be attached to or detached from the broadcasting signal receiver in the form of a slot or a memory stick.

If the scrambled broadcasting contents are received through the tuner 510 and the demodulator 520, the controller 560 may determine whether the received broadcasting contents are scrambled or not. If the received broadcasting contents are scrambled, the authentication unit 660 operates the authentication means.

The authentication unit 660 performs the authentication process in order to determine whether the broadcasting signal receiver is a proper host (broadcasting signal receiver) which can receive the pay broadcasting contents. Various authentication processes may be performed. For example, the authentication unit 660 may perform authentication process by comparing the Internet protocol (IP) address of an IP datagram in the received broadcasting contents with the unique address of the broadcasting signal receiver. The unique address of the broadcasting signal receiver may be a media access control (MAC) address. The authentication unit 660 extracts the IP address from the decapsulated IP datagram and obtains the receiver information mapped with the address. The authentication unit 660 may previously include information (for example, a table form) which can map the IP address with the receiver information and determine whether the IP address and the receiver information are equal to each other by comparison.

Alternatively, the authentication process may be performed by defining standardized identifier at the transmitter/receiver side, transmitting the identifier of the receiver for applying for the pay broadcasting service at the transmitter side, and determining whether the received identifier is equal to the identifier of the receiver at the receiver side. The transmitter side generates and stores the unique identifier of the receiver, which applies for the pay broadcasting service, in a database, and includes the identifier in an entitlement management message (EMM) and transmits the EMM if the broadcasting contents are scrambled. If the broadcasting contents are scrambled, a message (for example, an entitlement control message (ECM) or the EMM) such as conditional access system (CAS) information, mode information and message location information applied to the scrambling may be transmitted through the data header or another packet.

The ECM may include a control word (CW) used for scrambling. At this time, the CW may be encrypted by an authentication key. The EMM may include the authentication key and the entitlement information of the data. The authentication key may be encrypted by the distribution key of the receiver. If the broadcasting data is scrambled using the CW and information for authentication and information for descrambling are transmitted from the transmitter side, the receiver side may encrypt the CW by the authentication key, include the CW in the ECM, and transmit the ECM.

The transmitter side includes the authentication key used for encrypting the CW and the reception entitlement of the broadcasting signal receiver (for example, a standardized serial number of the broadcasting signal receiver having the reception entitlement) in the EMM and transmits the EMM.

Accordingly, the authentication unit 660 of the broadcasting signal receiver extracts the unique identifier of the receiver, extracts the identifier included in the EMM of the received broadcasting service, determines whether the two identifiers are equal to each other, and performs the authentication process. If it is determined that the two identifiers are equal to each other by the authentication unit 660, the broadcasting signal receiver determine that the broadcasting signal receiver is the proper broadcasting signal receiver having the reception entitlement Alternatively, the broadcasting signal receiver may include authentication means 3008 in a detachable external module. At this time, the broadcasting signal receiver and the external module interface with each other through a common interface (CI). The external module may receive the scrambled data from the receiver through the CI, perform the descrambling, and transmit only the information necessary for descrambling to the receiver.

The CI includes a physical layer and at least one protocol layer. The protocol layer may have the structure including at least one layer for providing independent function in consideration of extensibility.

The external module may be a memory or card which does not include the descrambling function or a card which includes the descrambling function, while storing the key information and the authentication information used for scrambling. That is, the module may include the descrambling function in the form of hardware, middleware or software.

At this time, the receiver and the external module should be authenticated in order to provide the pay broadcasting service provided by the transmitter side to the user. Accordingly, the transmitter side may provide the pay broadcasting service to the pair of authenticated receiver and module.

The receiver and the external module may authenticate each other through the CI. The external module may communicate with the controller 560 of the receiver through the CI and authenticate the receiver. The broadcasting signal receiver may authenticate the module through the CI. The module may extract and transmit the unique ID of the broadcasting signal receiver and the unique ID of the module to the transmitter in the mutual authentication process. The transmitter side may use the IDs as service start information and payment information. The controller 560 may transmit the payment information to the remote transmitter side through a communication module 670 if necessary.

The authentication unit 660 authenticates the receiver and/or the external module and recognizes the receiver as the proper receiver which can receive the pay broadcasting service if the authentication process is successfully completed. The authentication unit 660 may receive authentication-related data from a mobile communication service provider in which the user of the receiver registers, instead of the transmitter for providing the broadcasting contents. In this case, the authentication-related data may be scrambled by the transmitter side for providing the broadcasting contents and may be transmitted through the mobile communication service provider or may be scrambled and transmitted by the mobile communication service provider.

If the authentication process of the authentication unit 660 is successfully completed, the receiver may descramble the scrambled broadcasting contents. The descrambling is performed by the descramblers 640 and 650 and the descramblers 640 and 650 may be in the receiver or the external module. The broadcasting signal receiver may include the CI, communicate with the external module including the descramblers 640 and 650, and descramble the received signal.

If the descramblers 640 and 650 are included in the receiver, the transmitter side (including at least one of the service provider and the broadcasting station) may scramble the data by the same scrambling method and transmit the scrambled data. If the descramblers 640 and 650 are included in the external module, the transmitters may scramble the data by different scrambling methods and transmit the scrambled data.

The controller 560 may communicate with the descramblers 640 and 650 by a predetermined interface. A CI protocol between the receiver and the external module includes a function for periodically checking the status of the counterpart in order to maintain normal mutual communication. The receiver and the module include a function for managing the status of the counterpart using this function, and, if any one of the receiver and the external module malfunctions, reporting the malfunction to the user or the transmitter side and performing a recovery function.

Alternatively, the authentication process may be performed by software, instead of hardware.

That is, if a memory card for previously storing CAS software through downloading is inserted, the broadcasting signal receiver receives and loads the CAS software from the memory card and performs the authentication process. The CAS software read from the memory card is stored in the memories 570 and 620 in the broadcasting signal receiver and is executed on the middleware in the form of one application. The middleware may be, for example, the Java middleware.

The broadcasting signal receiver may include a CI for connection to the memory card. The first memory 570 may be a volatile memory, a non-volatile memory or a flash memory (or a flash ROM). The memory card mainly uses a flash memory or a small-sized hard disc. The memory card may be used in at least one broadcasting signal receiver according to the contents of the stored CAS software, the authentication, the scrambling and the payment method. However, the CAS software includes at least information necessary for authentication and information necessary for descrambling.

Accordingly, the authentication unit 660 performs the authentication between the transmitter side and the broadcasting signal receiver or the broadcasting signal receiver and the memory card. The memory card may include the information on the proper broadcasting receiver which can be authenticated. For example, the information on the broadcasting signal receiver includes unique information such as the standardized serial number of the broadcasting signal receiver. Accordingly, the authentication unit 660 may compare the unique information such as the standardized serial number included in the memory card with the unique information of the broadcasting signal receiver and perform the authentication process of the memory card and the broadcasting signal receiver.

If the CAS software is executed on the Java middleware, the authentication process of the broadcasting signal receiver and the memory card is performed. For example, it is checked whether the unique number of the broadcasting signal receiver included in the CAS software is equal to the unique number of the broadcasting signal receiver read through the controller 560 of the broadcasting signal receiver. If the unique numbers are equal to each other, the memory card is the normal memory card which can be used in the broadcasting signal receiver. At this time, the CAS software may be included in the memories 570 and 620 at the time of shipment of the broadcasting signal receiver or may be stored in the memories 570 and 620 from the transmitter side, the module or the memory card. The descrambling function may be performed by the data broadcasting application in the form of one application.

The CAS software may parse the EMM/ECM packet output from the demultiplexer 530, check whether the receiver has the reception entitlement, and obtain and provide the information (that is, the CW) necessary for descrambling to the descramblers 640 and 650. The CAS software executed on the middleware reads the unique number of the broadcasting signal receiver from the broadcasting signal receiver, compares it with the unique number of the broadcasting signal receiver received by the EMM, and checks the reception entitlement of the current broadcasting signal receiver.

When the reception entitlement of the broadcasting signal receiver is checked, it is checked whether the broadcasting signal receiver has the entitlement for receiving the broadcasting service using the reception entitlement of the broadcasting service and the broadcasting service information transmitted by the ECM. If the entitlement for receiving the broadcasting service is checked, the encrypted CW transmitted by the ECM is decrypted using the authentication key transmitted by the EMM and is output to the descramblers 640 and 650. The descramblers 640 and 650 descramble the broadcasting service using the CW.

The CAS software stored in the memory card can extend according to the pay service provided by the broadcasting station. The CAS software may include information related to the authentication and the descrambling and additional information. The broadcasting signal receiver may download the CAS software from the transmitter side and upgrade the CAS software stored in the memory card.

The descramblers 640 and 650 may be included in the module in the hardware or software form. In this case, the scrambled reception data may be descrambled by the module and may be decoded.

If the scrambled reception data is stored in the second memory 620, the scrambled data may be descrambled and stored or the scrambled data may be stored in a state of being descrambled and may be descrambled at the time of reproduction thereof. If the scrambling/descrambling algorithm is included in the memory controller 610, the memory controller 610 may scramble the scrambled reception signal again and store the scrambled data in the second memory 620.

Alternatively, the descrambled (conditionally accessed) broadcasting contents are transmitted through a broadcasting network and information related to the authentication for releasing conditional access and the descrambling is transmitted/received through the communication module 670 such that the bidirectional communication is possible in the broadcasting signal receiver.

The broadcasting signal receiver transmits/receives the unique information ID such as the MAC address or the serial number of the broadcasting signal receiver to/from the communication module 670 in the transmitter side such that the transmitter side recognizes the broadcasting data which is desired to be transmitted/received to/from the remote transmitter side and the broadcasting signal receiver to which the broadcasting data is transmitted.

The communication module 670 of the broadcasting signal receiver may support a protocol necessary for performing the bidirectional communication with the communication module 670 of the transmitter side in the broadcasting signal receiver which does not support the bidirectional communication function. The broadcasting signal receiver configures a protocol data unit (PDU) using a tag-length-value (TLV) coding method including the unique information ID and the data to be transmitted. The tag field includes the indexing of the PDU and the length field includes the length of the value field, and the value field includes the unique number ID of the broadcasting signal receiver and actual data to be transmitted.

The broadcasting signal device may mount the Java platform and configure the platform which is operated after downloading the Java application to the broadcasting signal receiver through a network. In this case, the PDU including the tag field which is arbitrarily defined by the transmitter side may be downloaded to the storage medium of the broadcasting signal receiver and may be transmitted to the communication module 670.

At this time, the broadcasting signal receiver may include the CI and may include a wireless application protocol (WAP) and a CDMA 1×EV-D0, both of which are accessible through a mobile communication base station such as a CDMA or a GSM and a wireless LAN, the mobile Internet, the WiBro, and the Wimax interface, all of which are accessible through an access point, in transmission/reception through a wireless data network.

Figure 17:
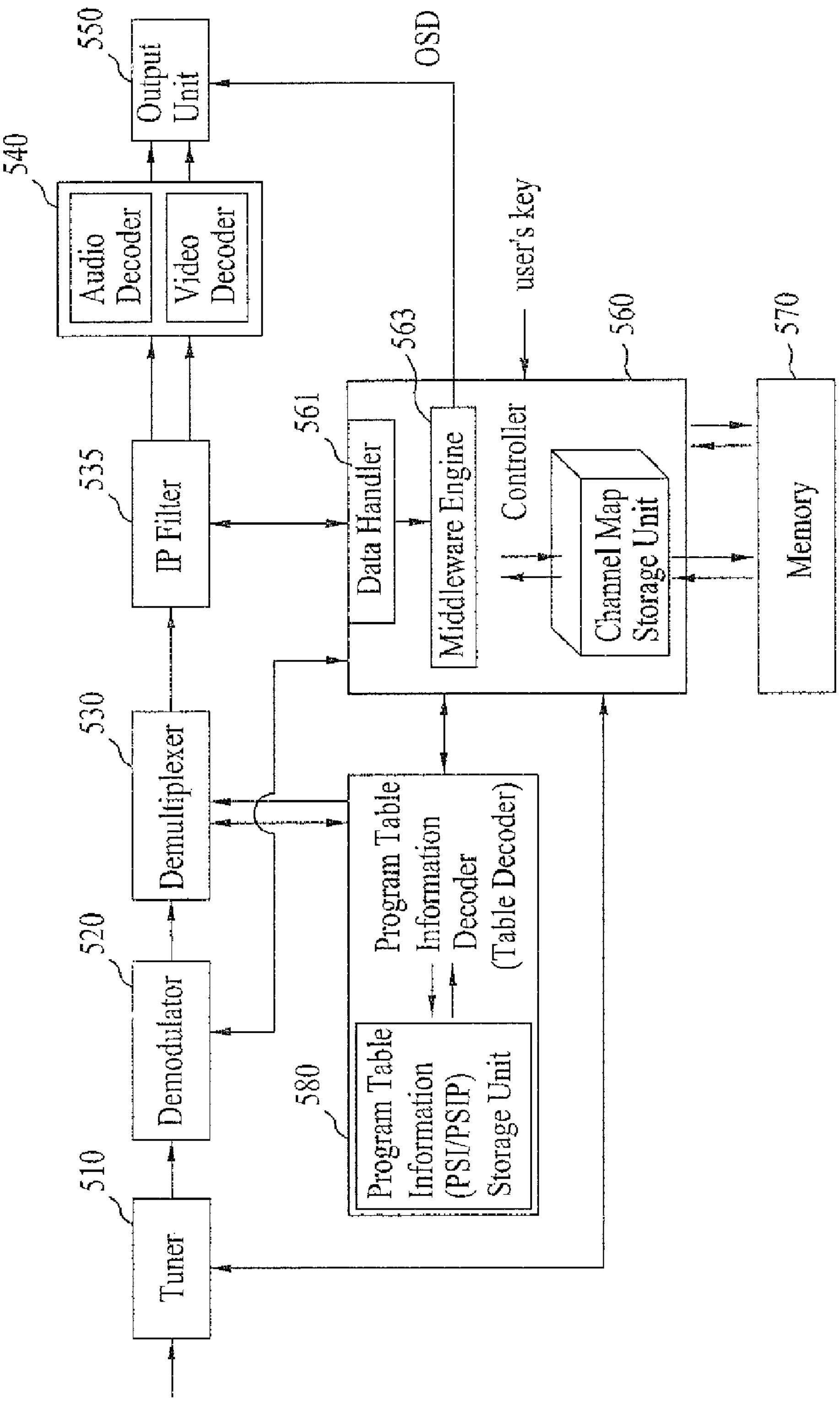
FIG. 17 is a view showing a broadcasting signal receiver according to another embodiment.

FIG. 17 is a view showing a broadcasting signal receiver according to another embodiment. The broadcasting signal receiver according to the present embodiment will be described with reference to FIG. 17. The broadcasting signal receiver includes a tuner 510, a demodulator 520, a demultiplexer 530, an IP filter 535, a decoder 540, an output unit 550, a controller 560, a memory 570 and a program table information decoder 580. The operations of the components of the broadcasting signal receiver shown in FIG. 17, which are equal to those of FIG. 13, were described with reference to FIG. 13.

For example, the controller 560 determines whether the handover occurs, using the power of the signal tuned by the tuner 510 or the signal demodulated by the demodulator 520. The controller 560 controls the tuner 510 to tune the broadcasting channel received from the second cell using the physical channel information of all the adjacent cells obtained from the parsed NIT information if it is determined that the handover occurs. The controller 560 may obtain the identifier of the cell from the signaling information output from the demodulator 520 and determine from which cell the received signal is received, using the identifier. The controller 560 determines whether the power of the signal received from the second cell is greater than the second threshold value and hands over from the previous cell to the second cell if the power is greater than the second threshold value. If so not, the broadcasting signal is received from the previous cell or the channel is tuned to another cell (third cell).

The controller 560 may parse the NIT information from the signal from the second cell to which the broadcasting signal receiver is handed over, obtain the physical channel information of the second cell and the cells adjacent to the second cell, and previously acquire the physical channel information of the cells according to the handover which will occur later.

The broadcasting signal device shown in FIG. 17 may receive the broadcasting signal including an IP stream and process and output the video/audio/data signal included in the IP stream.

The examples of the tuner 510, the demodulator 520 and the demultiplexer 530 are shown in FIG. 13. The tuner 510 tunes the channel selected by the user and outputs the broadcasting signal of the channel. The demodulator 520 demodulates the signal output from the tuner 510 and outputs the demodulated signal. The demultiplexer 530 demultiplexes the signal output from the demodulator 520 and outputs the demultiplexed signal.

In the example shown in FIG. 17, the demultiplexer 530 may demultiplex the IP stream in addition to the video/audio stream and the program table information from the demodulated signal. If the IP stream is included in a private section of the MPEG-2 TS and is transmitted, the demultiplexer 530 outputs the private section including the IP stream to the program table information decoder 580. The program table information decoder 580 may decode the private section and output the IP stream to the IP filter 535. Alternatively, if the IP stream is not included in the private section and an IP datagram is included directly in demodulated stream, the IP datagram may be demultiplexed from the demodulated signal and may be output to the IP filter 535.

The IP filter 535 may selectively output the IP stream selected by the user according to the control signal of the controller 560. The output IP stream may be output to the decoder 540 and the video/audio information included in the IP stream may be output from the output unit 550. The IP stream may include the program table information including channel information of at least one cell A data handler 561 may process and output the data broadcasting signal transmitted from the IP filter 535 by the IP datagram and a middleware engine 563 controls the environment of the broadcasting receiving system such that the broadcasting data is output and processes and outputs the broadcasting data together with the video/audio data output from the output unit 550.

The effects of the broadcasting signal receiver and the method for transmitting/receiving the broadcasting signal are as follows.

First, the cell can be identified in the MFN environment and thus the mobile reception of the broadcasting signal is possible. Second, a mobile reception broadcasting system compatible with a fixed reception broadcasting system can be provided. Third, although the user moves to an area in which the broadcasting signal is transmitted with a different frequency in the MFN environment, the same broadcasting program can be conveniently viewed without tuning the channel.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of transmitting a broadcast signal in a transmitter, the method comprising:

encoding mobile data for an additional forward error correction (FEC);

block processing the encoded mobile data by a specific code rate of ½;

forming data groups including the block processed mobile data, each of the data groups further including signaling information and a plurality of known data sequences, wherein at least two of the plurality of known data sequences have different lengths, and wherein the signaling information includes information for a plurality of Reed-Solomon (RS) code modes for the mobile data and information for a plurality of serial concatenated convolutional code (SCCC) modes for the mobile data, wherein one of the plurality of SCCC modes indicates the specific code rate, wherein each of the data groups further includes a plurality of areas and the signaling information is inserted into a specific area of the plurality of areas;

forming a mobile data packet including data in the data groups;

multiplexing a main data packet including main data and the mobile data packet;

performing systematic RS encoding on the main data in the multiplexed packets and non-systematic RS encoding on the mobile data in the multiplexed packets;

trellis encoding the RS encoded main data and mobile data in a trellis encoder, wherein a memory included in the trellis encoder is initialized at a start of each known data sequence; and transmitting data groups including the trellis-encoded data, wherein the data groups are transmitted within slots, the slots being basic time periods for multiplexing the mobile data and the main data.

2. The method of claim 1, wherein the formed data groups include placeholders for the main data, an MPEG-2 header and non-systematic RS parity.

3. A method of receiving a broadcast signal in a receiver, the method comprising:

receiving a broadcast signal in which main data and data groups of mobile data are multiplexed, wherein the receiver is turned on during slots, and the data groups are received during the slots that are basic time periods for multiplexing of mobile data and the main data, wherein each of the data groups includes the mobile data, signaling information and a plurality of known data sequences, wherein at least two of the plurality of known data sequences have different lengths, and the signaling information includes information for a plurality of Reed-Solomon (RS) code modes for the mobile data and information for a plurality of serial concatenated convolutional code (SCCC) modes for the mobile data, wherein the main data is data encoded by a systematic RS encoding method, wherein the mobile data is data encoded by an additional forward error correction (FEC) process and a non-systematic RS encoding method, and wherein each of the data groups includes a plurality of areas and the signaling information is inserted into a specific area of the plurality of areas;

demodulating the received broadcast signal;

decoding the signaling information;

block processing the mobile data by a specific code rate of either ½or ¼, wherein one of the plurality of SCCC modes indicates the specific code rate;

decoding the block processed mobile data;

performing error detection for the mobile data by cyclic redundancy check (CRC) decoding; and performing error correction for the mobile data by RS decoding.

4. An apparatus for transmitting a broadcast signal in a transmitter, the apparatus comprising:

a first encoder configured to encode mobile data for an additional forward error correction (FEC);

a block processor configured to block process the encoded mobile data by a specific code rate of ½;

a group formatter configured to form data groups including the block processed mobile data, each of the data groups further including signaling information and a plurality of known data sequences, wherein at least two of the plurality of known data sequences have different lengths, wherein the signaling information includes information for a plurality of Reed-Solomon (RS) code modes for the mobile data and information for a plurality of serial concatenated convolutional code (SCCC) modes for the mobile data, wherein one of the plurality of SCCC modes indicates the specific code rate, and wherein each of the data groups further includes a plurality of areas and the signaling information is inserted into a specific area of the plurality of areas;

a packet formatter configured to form a mobile data packet including data in the data groups;

a multiplexer configured to multiplex a main data packet including main data and the mobile data packet;

a second encoder configured to perform systematic RS encoding on the main data in the multiplexed packets and non-systematic RS encoding on the mobile data in the multiplexed packets;

a trellis encoder configured to trellis encode the RS encoded main and mobile data, wherein a memory included in the trellis encoder is initialized at a start of each known data sequence; and a transmission unit configured to transmit data groups including the trellis-encoded data, wherein the data groups are transmitted during slots, the slots being basic time periods for multiplexing the mobile data and the main data.

5. The apparatus of claim 4, wherein the data groups formed by the group formatter include placeholders for the main data, an MPEG-2 header and non-systematic RS parity.

6. An apparatus for receiving a broadcast signal, the apparatus comprising:

a tuner configured to receive a broadcast signal in which main data and data groups of mobile data are multiplexed, wherein the receiver is turned on during slots, and the data groups are received during the slots which are basic time periods for multiplexing mobile data and the main data, wherein each of the data groups includes the mobile data, signaling information and a plurality of known data sequences, at least two of the plurality of known data sequences having different lengths, wherein the signaling information includes information for a plurality of Reed-Solomon (RS) code modes for the mobile data and information for a plurality of serial concatenated convolutional code (SCCC) modes for the mobile data, wherein the main data is data encoded by a systematic RS encoding method, wherein the mobile data is data encoded by an additional forward error correction (FEC) process and a non-systematic RS encoding method, and wherein each of the data groups includes a plurality of areas and the signaling information is inserted into a specific area of the plurality of areas;

a demodulator configured to demodulate the received broadcast signal;

a first decoder configured to decode the signaling information;

a block processor configured to process the mobile data by a specific code rate of either ½or ¼, wherein one of the plurality of SCCC modes indicates the specific code rate; and a second decoder configured to decode mobile data in the demodulated broadcast signal, wherein an error detection for the mobile data is performed by cyclic redundancy check (CRC) decoding, and an error correction for the mobile data is performed by RS decoding.

* * * * *